US012101752B2

(12) United States Patent
Jiang et al.

(10) Patent No.: US 12,101,752 B2
(45) Date of Patent: Sep. 24, 2024

(54) METHOD AND DEVICE IN FIRST NODE FOR WIRELESS COMMUNICATION

(71) Applicants: Qi Jiang, Shanghai (CN); Xiaobo Zhang, Shanghai (CN); Lin Yang, Shanghai (CN)

(72) Inventors: Qi Jiang, Shanghai (CN); Xiaobo Zhang, Shanghai (CN); Lin Yang, Shanghai (CN)

(73) Assignee: SHANGHAI LANGBO COMMUNICATION TECHNOLOGY COMPANY LIMITED, Shanghai (CN)

( * ) Notice: Subject to any disclaimer, the term of this patent is extended or adjusted under 35 U.S.C. 154(b) by 0 days.

(21) Appl. No.: 18/368,571

(22) Filed: Sep. 15, 2023

(65) Prior Publication Data

US 2024/0008028 A1    Jan. 4, 2024

Related U.S. Application Data

(63) Continuation of application No. 17/565,416, filed on Dec. 29, 2021, now Pat. No. 11,800,509, which is a
(Continued)

(30) Foreign Application Priority Data

Dec. 20, 2018  (CN) .......................... 201811561074.7

(51) Int. Cl.
*H04W 72/12*   (2023.01)
*H04L 5/00*    (2006.01)
(Continued)

(52) U.S. Cl.
CPC ........... *H04W 72/12* (2013.01); *H04L 5/0055* (2013.01); *H04W 4/40* (2018.02); *H04W 24/08* (2013.01); *H04W 72/044* (2013.01)

(58) Field of Classification Search
CPC .. H04L 5/0055; H04W 72/1205; H04W 4/40; H04W 24/08; H04W 72/044
See application file for complete search history.

(56) References Cited

U.S. PATENT DOCUMENTS 11,800,509 B2 * 10/2023 Jiang ................... H04W 72/044
2010/0329194 A1    12/2010 Shen et al.
(Continued)

FOREIGN PATENT DOCUMENTS

CN    106559187 A    4/2017
CN    107889268 A    4/2018

OTHER PUBLICATIONS

CN 1st Office Action received in application No. 201811561074.7 dated May 27, 2020.
(Continued)

*Primary Examiner* — Chi H Pham
*Assistant Examiner* — Weibin Huang

(57) ABSTRACT

The present disclosure provides a method and a device in a first node for wireless communication. The first node first performs a monitoring on first-type signalings, in which K1 first-type signalings are detected; and then transmits a first radio signal in a first time-frequency resource set; each of the K1 first-type signalings is associated to the first time-frequency resource set; a first signaling is a last first-type signaling of the K1 first-type signaling; the first radio signal is used for determining the receiving of first-type signaling(s) associated to the first time-frequency resource set before the first signaling; or is used for determining the decoding of bit blocks scheduled by the K1 first-type signalings. With the above-mentioned designs, the present disclosure manages to address missed detection of sidelink scheduling signaling caused when a data receiver sends NACK-only feedback in V2X, thereby further improving the entire system performance.

20 Claims, 12 Drawing Sheets

Related U.S. Application Data continuation of application No. 16/721,947, filed on Dec. 20, 2019, now Pat. No. 11,252,738.

(51) Int. Cl.
*H04W 4/40* (2018.01)
*H04W 24/08* (2009.01)
*H04W 72/044* (2023.01)

(56) References Cited

U.S. PATENT DOCUMENTS

| | | | |
|---|---|---|---|
| 2016/0365097 A1* | 12/2016 | Guan | G10L 19/005 |
| 2019/0007974 A1* | 1/2019 | Nguyen | H04L 67/12 |
| 2019/0044667 A1* | 2/2019 | Guo | H04L 1/1822 |
| 2019/0052436 A1* | 2/2019 | Desai | H04W 72/0446 |
| 2019/0268938 A1* | 8/2019 | Zhao | H04W 74/02 |
| 2020/0029318 A1* | 1/2020 | Guo | H04L 1/1822 |
| 2020/0059766 A1* | 2/2020 | Kim | H04W 28/26 |
| 2020/0329469 A1* | 10/2020 | Su | H04L 5/00 |
| 2020/0404684 A1* | 12/2020 | Lee | H04L 1/1896 |
| 2021/0297199 A1* | 9/2021 | Miao | H04W 72/20 |
| 2022/0030598 A1* | 1/2022 | Li | H04W 72/0446 |

OTHER PUBLICATIONS

CN 1st Search report in application No. 201811561074.7 dated May 17, 2020.
3GPP TSG-RAN2 Meeting #88 R2-145065, ASUSTeK Uu interface-ProSe Communication R2-145065 (Nov. 8, 2014).
CN201811561074.7 Notification to Grant Patent Right for Invention dated Aug. 25, 2021.

\* cited by examiner

METHOD AND DEVICE IN FIRST NODE FOR WIRELESS COMMUNICATION

CROSS-REFERENCE TO RELATED APPLICATION

This application is the continuation of the U.S. patent Ser. No. 17/565,416, filed on Dec. 29, 2021, which is the continuation of the U.S. patent Ser. No. 16/721,947, filed on Dec. 20, 2019, which claims the priority benefit of Chinese Patent Application Serial Number 201811561074.7, filed on Dec. 20, 2018, the full disclosure of which is incorporated herein by reference.

BACKGROUND

Technical Field

The present disclosure relates to transmission methods and devices in wireless communication systems, and in particular to a method and a device of communication on Sidelink in wireless communications.

Related Art

Application scenarios of future wireless communication systems are becoming increasingly diversified, and different application scenarios have different performance demands on systems. In order to meet different performance requirements of various application scenarios, the 3rd Generation Partner Project (3GPP) Radio Access Network (RAN) #72 plenary session decided to conduct the study of New Radio (NR), or what is called fifth Generation (5G). The work Item (WI) of NR was approved at the 3GPP RAN #75 plenary session to standardize the NR.

In response to rapidly growing Vehicle-to-Everything (V2X) business, 3GPP has started standards setting and research work under the framework of NR. Currently, 3GPP has completed planning work targeting 5G V2X requirements and has included these requirements into standard TS22.886, where 3GPP identifies and defines 4 major Use Case Groups, covering cases of Vehicles Platooning, supporting Extended Sensors, Advanced Driving and Remote Driving. At 3GPP RAN #80 Plenary Session, the technical Study Item (SI) of NR V2X was initialized.

SUMMARY

To fulfill new service requirements, compared with conventional LTE V2X system, NR V2X system will be provided with higher throughput and reliability, lower latency, longer communication distance and more precise positioning, more various packet size and transmission periods, as well as other key techniques that can support coexistence of 3GPP and non-3GPP more efficiently. Currently, the LTE-V2X system is limited to broadcast communication, while the study of NR V2X will focus on technical solutions supporting unicast, groupcast and broadcast simultaneously, as commonly agreed at the 3GPP RAN #80 Plenary Session.

In the existing LTE Device to Device (D2D)/V2X, a Physical Sidelink Feedback Channel (PSFCH) is introduced into Release 16 V2X, which is at least used for Hybrid Automatic Repeat request (HARQ) feedback on Sidelink. As for groupcast transmission, it is generally acknowledged that sending Non-Acknowledgement (NACK) only when a Physical Sidelink Shared Channel (PSSCH) is not correctly received will be beneficial to lowering the feedback signaling overhead. However, sending NACK-only may confuse a data transmitter when not receiving NACK because the transmitter cannot determine whether a data receiver does not transmit NACK because the data has been correctly received or because the receiver does not know the data exists without receiving scheduling information.

To address the above problem, the present disclosure provides a solution to support unicast and groupcast communications. It should be noted that embodiments of a User Equipment (UE) in the present disclosure and characteristics of the embodiments may be applied to a base station, and vice versa, if no conflict is incurred. The embodiments in the present disclosure and the characteristics of the embodiments may be arbitrarily combined if there is no conflict. Though originally targeted at unicast-based mechanism, the present disclosure is also applicable to broadcast and groupcast communications. Further, the present disclosure is designed for single-carrier communication but is also used in multicarrier communication.

The present disclosure provides a method in a first node for wireless communication, comprising:
  performing a monitoring on first-type signalings, in which K1 first-type signalings are detected; and
  transmitting a first radio signal in a first time-frequency resource set;
  herein, each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; the K1 is a positive integer.

The present disclosure provides a method in a first node for wireless communication, comprising:
  performing a monitoring on first-type signalings, in which K1 first-type signalings are detected; and
  transmitting a first radio signal in a first time-frequency resource set;
  herein, each of the K1 first-type signalings is associated to the first time-frequency resource set; a first signaling is a last first-type signaling of the K1 first-type signalings in time domain; the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

In one embodiment, an advantage of the above method is that a first time-frequency resource set is associated to a plurality of first-type signalings, so that the receiver of V2X information is able to report the receiving situation of all physical layer signalings associated to the first time-frequency resource set and of data channels scheduled by the signalings to the transmitter of V2X information via the first radio signal, thereby guaranteeing the transmission performance on V2X link.

In one embodiment, another advantage of the above method is that since the V2X link only reflects NACK scenarios, the first signaling is a last first-type signaling of all first-type signalings associated to the first time-frequency resource set detected by the first node, furthermore, the first radio signal also notifies the second node in the present disclosure whether the first node has missed detection on any first-type signaling before the first signaling, thus solving the problem of not reflecting NACK resulted from missed detection by scheduling in NACK-Only feedback.

According to one aspect of the present disclosure, the above method is characterized in comprising:

receiving first information;

herein, the first information is used for indicating a second time domain resource set, the K1 first-type signalings respectively occupy K1 second time domain resource subsets in time domain, the second time domain resource set comprises the K1 second time domain resource subsets.

According to one aspect of the present disclosure, the above method is characterized in that the phrase that each of the K1 first-type signalings is associated to the first time-frequency resource set means that the K1 is greater than 1, each of the K1 first-type signalings indicates the first time-frequency resource set.

In one embodiment, an advantage of the above method is that indicating the first time-frequency resource set via first-type signalings enables more flexible configuration of the first time-frequency resource set.

According to one aspect of the present disclosure, the above method is characterized in that the phrase that each of the K1 first-type signalings is associated to the first time-frequency resource set means that time domain resources occupied by each of the K1 first-type signalings belong to a second time domain resource set, the second time domain resource set is associated to the first time-frequency resource set.

In one embodiment, an advantage of the above method is that connecting the second time domain resource set to the first time-frequency resource set helps reduce the signaling overhead.

According to one aspect of the present disclosure, the above method is characterized in that a first bit is used for generating the first radio signal; the first bit is used for determining that there is(are) first-type signaling(s) associated to the first time-frequency resource set not having been correctly decoded in a time domain position before the first signaling.

According to one aspect of the present disclosure, the above method is characterized in that a first bit is used for generating the first radio signal; the first bit is used for determining that there is not any first-type signaling associated to the first time-frequency resource set not having been correctly decoded in a time domain position before the first signaling, and at least one of the K1 first-type signalings schedules a bit block that is not decoded correctly.

In one embodiment, an advantage of the above method is that the receiving of first-type signalings associated to the first time-frequency resource set and of bit blocks scheduled by the first-type signalings can be reflected through the first bit alone, thereby reducing the signaling overhead.

According to one aspect of the present disclosure, the above method is characterized in that a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of the K2 second time domain resource subsets; the K2 bits are used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1.

According to one aspect of the present disclosure, the above method is characterized in that a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining that K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

In one embodiment, an advantage of the above method is that the second bit sequence is used to indicate to the second node first-type signaling(s) undetected by the first node and bit blocks not having been correctly received by data scheduled by first-type signalings detected by the first node; thus increasing the precision of the feedback and improving the transmission performance on the V2X link.

According to one aspect of the present disclosure, the above method is characterized in comprising:

receiving K1 radio signals;

herein, the K1 first-type signalings are respectively used for scheduling the K1 radio signals, K1 bit blocks are used for generating the K1 radio signals.

According to one aspect of the present disclosure, the above method is characterized in that each of the M1 first-type signalings is associated to the first time-frequency resource set, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signalings; the M1 is a positive integer not less than the K1.

In one embodiment, an advantage of the above method is that by introducing a first field, the first node will be aware of the position of a first-type signaling in the M1 first-type signalings whenever the first-type signaling is detected, therefore, the first node is able to determine whether there is any other first-type signaling missed out before the detected first-type signaling in time domain.

The present disclosure provides a method in a second node for wireless communication, comprising:

transmitting M1 first-type signalings; and monitoring a first radio signal in a first time-frequency resource set;

herein, each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; the K1 is a positive integer, and the M1 is a positive integer not less than the K1.

The present disclosure provides a method in a second node for wireless communication, comprising:
  transmitting M1 first-type signalings; and
  monitoring a first radio signal in a first time-frequency resource set;
  herein, each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is not any first-type signaling associated to the first time-frequency resource set not having been correctly decoded by the first node in a time domain position before the first signaling, and at least one of the K1 first-type signalings schedules a bit block that is not decoded correctly by the first node; the K1 is a positive integer, and the M1 is a positive integer not less than the K1.

According to one aspect of the present disclosure, the above method is characterized in comprising:
  transmitting first information;
  herein, the first information is used for indicating a second time domain resource set, the M1 first-type signalings respectively occupy M1 second time domain resource subsets in time domain, the second time domain resource set comprises the M1 second time domain resource subsets.

According to one aspect of the present disclosure, the above method is characterized in that the phrase that each of the M1 first-type signalings is associated to the first time-frequency resource set means that time domain resources occupied by each of the M1 first-type signalings belong to a second time domain resource set, the second time domain resource set is associated to the first time-frequency resource set.

According to one aspect of the present disclosure, the above method is characterized in that a first bit is used for generating the first radio signal, the first bit is used for determining that there is(are) first-type signaling(s) associated to the first time-frequency resource set not having been correctly decoded by the first node in a time domain position before the first signaling.

According to one aspect of the present disclosure, the above method is characterized in that a first bit is used for generating the first radio signal, the first bit is used for determining that there is not any first-type signaling associated to the first time-frequency resource set not having been correctly decoded by the first node in a time domain position before the first signaling, and at least one of the K1 first-type signalings schedules a bit block that is not decoded correctly by the first node.

According to one aspect of the present disclosure, the above method is characterized in that a second bit sequence is used for generating the first radio signal; the second bit sequence comprises K2 bits, the K2 is a positive integer no less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1.

According to one aspect of the present disclosure, the above method is characterized in that a second bit sequence is used for generating the first radio signal; the second bit sequence comprises K2 bits, the K2 is a positive integer no less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining that K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

According to one aspect of the present disclosure, the above method is characterized in comprising:
  transmitting M1 radio signals;
  herein, the M1 first-type signalings are respectively used for scheduling the M1 radio signals, M1 bit blocks are used for generating the M1 radio signals.

According to one aspect of the present disclosure, the above method is characterized in that any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signaling.

The present disclosure provides a first node for wireless communication, comprising:
  a first receiver, performing a monitoring on first-type signalings, in which K1 first-type signalings are detected; and
  a first transmitter, transmitting a first radio signal in a first time-frequency resource set;
  herein, each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; the K1 is a positive integer.

The present disclosure provides a first node for wireless communication, comprising:
  a first receiver, performing a monitoring on first-type signalings, in which K1 first-type signalings are detected; and
  a first transmitter, transmitting a first radio signal in a first time-frequency resource set;
  herein, each of the K1 first-type signalings is associated to the first time-frequency resource set; a first signaling is a last first-type signaling of the K1 first-type signalings in time domain; the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

The present disclosure provides a second node for wireless communication, comprising:
  a second transmitter, transmitting M1 first-type signalings; and a second receiver, monitoring a first radio signal in a first time-frequency resource set;

herein, each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; the K1 is a positive integer, and the M1 is a positive integer not less than the K1.

The present disclosure provides a second node for wireless communication, comprising:

a second transmitter, transmitting M1 first-type signalings; and a second receiver, monitoring a first radio signal in a first time-frequency resource set;

herein, each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is not any first-type signaling associated to the first time-frequency resource set not having been correctly decoded by the first node in a time domain position before the first signaling, and at least one of the K1 first-type signalings schedules a bit block that is not decoded correctly by the first node; the K1 is a positive integer, and the M1 is a positive integer not less than the K1.

In one embodiment, the present disclosure is advantageous over conventional schemes in the following aspects:

By connecting the first time-frequency resource set with a plurality of first-type signalings, the receiver of V2X information reports the receiving situation of all physical layers associated to the first time-frequency resource set and of scheduled data channels to the transmitter of the V2X information via the first radio signal so as to ensure the transmission performance on the V2X link.

Given that the V2X link only reflects the NACK scenarios, the first signaling is a last first-type signaling of all first-type signalings associated to the first time-frequency resource set detected by the first node, and the first radio signal also notifies the second node of the present disclosure whether the first node has missed detection on any first-type signaling before the first signaling, so as to solve the problem of not sending NACK due to missed detection of scheduling that occurs in NACK-only feedback.

By designing bits or bit sequence(s) in the first radio signal, it is practicable to reflect undetected first-type signaling(s) and bit blocks incorrectly detected by data channel(s) in correctly detected first-type signaling(s), thereby improving the feedback quality and enhancing the V2X link performance.

By introducing a first field, the first node will be aware of the position of a first-type signaling in the M1 first-type signalings whenever a first-type signaling is detected, and will thus be able to determine whether there is missed detection of any other first-type signaling in time domain before the detected first-type signaling.

BRIEF DESCRIPTION OF THE DRAWINGS

Other features, objects and advantages of the present disclosure will become more apparent from the detailed description of non-restrictive embodiments taken in conjunction with the following drawings.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
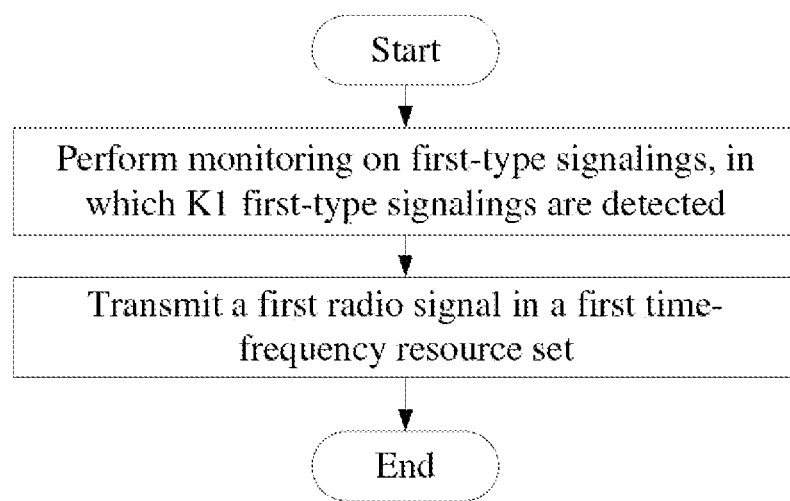
FIG. 1 illustrates a flowchart of performing a monitoring on first-type signalings according to one embodiment of the present disclosure.

Embodiment 1 illustrates a flowchart of performing a monitoring on first-type signaling, as shown in FIG. 1.

In Embodiment 1, the first node in the present disclosure first performs a monitoring on first-type signalings, in which K1 first-type signalings are detected; and then transmits a first radio signal in a first time-frequency resource set; each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; or, the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

In one embodiment, the phrase that K1 first-type signalings are detected means that the K1 first-type signalings respectively comprise K1 Cyclic Redundancy Check (CRC) sequences, the first node determines that the K1 first-type signalings are correctly decoded respectively based on detections on the K1 CRC sequences.

In one embodiment, the phrase that K1 first-type signalings are detected means that a target first-type signaling is any of the K1 first-type signalings, the target first-type signaling comprises a CRC sequence scrambled by a given RNTI, the first node performs CRC sequence check using the given RNTI and the CRC sequence check is completed successfully, the first node assumes that the target first-type signaling is correctly decoded.

In one embodiment, the phrase that K1 first-type signalings are detected means that a target first-type signaling is any of the K1 first-type signalings, the target first-type signaling comprises a CRC sequence; the first node, after receiving the target first-type signaling, employs the CRC sequence comprised by the received target first-type signaling in the Modulo (Mod) 2 Division of the Cyclic Generation Polynomial of the CRC sequence, which yields a remainder of then the first node assumes that the target first-type signaling is correctly decoded.

In one embodiment, the phrase that K1 first-type signalings are detected means that the K1 first-type signalings are respectively composed of K1 characteristic sequences, the first node determines that the K1 first-type signalings are correctly received respectively based on coherent detections.

In one embodiment, the phrase that K1 first-type signalings are detected means that a target first-type signaling is any of the K1 first-type signalings, the target first-type signaling is generated by a first target sequence, the first target sequence is one of L1 first-type candidate sequences; the L1 is a positive integer greater than 1; through coherent detections, the first node determines the first target sequence out of the L1 first-type candidate sequences according to the monitored target first-type signaling, and then assumes that the target first-type signaling is correctly received.

In one embodiment, the phrase that K1 first-type signalings are detected means that a target first-type signaling is any of the K1 first-type signalings, the target first-type signaling is generated by one of L1 first-type candidate sequences; the L1 is a positive integer greater than 1; through coherent detections, the first node can determine a first-type candidate sequence out of the L1 first-type candidate sequences according to the monitored target first-type signaling, and then assumes that the target first-type signaling is correctly received.

In one embodiment, the phrase that K1 first-type signalings are detected means that the first node determines that the K1 first-type signalings are correctly received based on energy detection.

In one embodiment, the phrase that K1 first-type signalings are detected means that a power value of any of the K1 first-type signalings monitored by the first node is not less than a first threshold, the first node assumes that the K1 first-type signalings are correctly received.

In one embodiment, the phrase that there is(are) first-type signaling(s) associated to the first time-frequency resource set not having been correctly decoded in a time domain position before the first signaling means that the first time-frequency resource set is associated to M1 first-type signalings, among the M1 first-type signalings there are K2 first-type signalings located in a time domain position before the first signaling; the K2 first-type signalings include the K1 first-type signalings detected by the first node, and the K2 first-type signalings at least include one first-type signaling not having been correctly decoded by the first node other than the K1 first-type signalings.

In one subembodiment of the above embodiment, the phrase that one first-type signaling not having been correctly decoded by the first node means that the first-type signaling comprises a CRC sequence, the first node determines that the first-type signaling is not correctly decoded based on a detection on the CRC sequence.

In one subembodiment of the above embodiment, the phrase that one first-type signaling not having been correctly decoded by the first node means that the first-type signaling comprises a CRC sequence scrambled by a given RNTI, the first node performs CRC sequence check using the given RNTI and the CRC sequence check is failed, the first node assumes that the target first-type signaling is correctly decoded.

In one subembodiment of the above embodiment, the phrase that one first-type signaling not having been correctly decoded by the first node means that the first-type signaling comprises a CRC sequence; the first node, after receiving the first-type signaling, employs the CRC sequence comprised by the received first-type signaling in the Modulo (Mod) 2 Division of the Cyclic Generation Polynomial of the CRC sequence, which yields a remainder unequal to 0, then the first node assumes that the target first-type signaling is not correctly decoded.

In one subembodiment of the above embodiment, the phrase that one first-type signaling not having been correctly decoded by the first node means that the first-type signaling is generated by a given characteristic sequence, the first node determines that the first-type signaling is correctly received based on coherent detection.

In one subembodiment of the above embodiment, the phrase that one first-type signaling not having been correctly decoded by the first node means that the first-type signaling is generated by a target sequence, the target sequence is one of L1 first-type candidate sequences; the L1 is a positive integer greater than 1; through coherent detections, the first node cannot determine the target sequence out of the L1 first-type candidate sequences according to the monitored first-type signaling, then the first node assumes that the first-type signaling is not correctly received.

In one subembodiment of the above embodiment, the phrase that one first-type signaling not having been correctly decoded by the first node means that the first-type signaling is generated by one of L1 first-type candidate sequences; the L1 is a positive integer greater than 1; through coherent detections, the first node cannot determine any first-type candidate sequence out of the L1 first-type candidate sequences according to the monitored first-type signaling, the first node then assumes that the first-type signaling is not correctly received.

In one subembodiment of the above embodiment, the phrase that one first-type signaling not having been correctly decoded by the first node means that the first node determines that the first-type signaling is not correctly received based on energy detection.

In one subembodiment of the above embodiment, the phrase that one first-type signaling not having been correctly decoded by the first node means that a power value of the first-type signaling monitored by the first node is less than a first threshold, the first node assumes that the first-type signaling is not correctly received.

In one embodiment, any of the K1 first-type signalings is a physical layer signaling.

In one embodiment, the K1 first-type signalings are Time Division Multiplexed (TDM).

In one embodiment, the K1 first-type signalings respectively occupy K1 second time domain resource subsets in time domain, any two of the K2 second time domain resource subsets are orthogonal in time domain.

In one embodiment, the K1 first-type signalings respectively occupy K1 second time domain resource subsets in time domain, a second time domain resource set comprises the K1 second time domain resource subsets, all first-type signalings detected in the second time domain resource set are transmitted by a same transmitter.

In one embodiment, the K1 is equal to 1.

In one embodiment, a physical layer channel occupied by any of the K1 first-type signalings includes a Physical Sidelink Control Channel (PSCCH).

In one embodiment, a signaling format corresponding to any of the K1 first-type signalings is a Sidelink Control Information (SCI) format 1.

In one embodiment, a signaling format corresponding to any of the K1 first-type signalings is an SCI format 0.

In one embodiment, any of the K1 first-type signalings comprises all fields of an SCI format 0, or any of the K1 first-type signalings comprises part of fields of an SCI format 0.

In one embodiment, any of the K1 first-type signalings comprises all fields of an SCI format 1, or any of the K1 first-type signalings comprises part of fields of an SCI format 1.

In one embodiment, the K1 first-type signalings respectively comprise K1 CRC sequences, each of the K1 CRC sequences is scrambled by a given RNTI, the given RNTI is specific to a terminal group, the terminal group comprises a positive integer number of terminal(s), and the first node is one of the positive integer number of terminal(s).

In one subembodiment, the K1 first-type signalings are all transmitted by a second node, the second node is a terminal of the terminal group other than the first node.

In one embodiment, the phrase that "perform a monitoring on first-type signalings" means that the first node realizes the monitoring on the first-type signalings through decoding of the first-type signalings.

In one embodiment, the phrase that "perform a monitoring on first-type signalings" means that the first node realizes the monitoring on the first-type signalings through sensing of the first-type signalings.

In one embodiment, the phrase that "perform a monitoring on first-type signalings" means that the first node realizes the monitoring on the first-type signalings through decoding and CRC check of the first-type signalings.

In one embodiment, the phrase that "perform a monitoring on first-type signalings" means that the first node realizes the monitoring on the first-type signalings through energy detection and decoding of the first-type signalings.

In one embodiment, the phrase that "perform a monitoring on first-type signalings" means that the first node realizes the monitoring on the first-type signalings through decoding of SCI.

In one embodiment, the phrase that "perform a monitoring on first-type signalings" means that the first node realizes the monitoring on the first-type signalings through sensing of SCI.

In one embodiment, the phrase that "perform a monitoring on first-type signalings" means that the first node performs decoding of SCI transmitted by other node(s).

In one embodiment, the phrase that "perform a monitoring on first-type signalings" means that the first node performs sensing of SCI transmitted by other node(s).

In one embodiment, the phrase that "perform a monitoring on first-type signalings" means that a second time domain resource set is associated to the first time-frequency resource set, the second time domain resource set comprises M1 second time domain resource subsets, the first node performs blind decoding on all SCI-transmitting candidates in each of the M1 second time domain resource subsets.

In one embodiment, the phrase that "perform a monitoring on first-type signalings" means that a second time domain resource set is associated to the first time-frequency resource set, the second time domain resource set comprises M1 second time domain resource subsets, the first node performs blind decoding on all candidates that may transmit SCI in each of the M1 second time domain resource subsets.

In one embodiment, the phrase that "perform a monitoring on first-type signalings" means that a second time domain resource set is associated to the first time-frequency resource set, the second time domain resource set comprises M1 second time domain resource subsets, the first node performs blind decoding on given SCI format(s) within REs occupied by all candidates that may transmit SCI in each of the M1 second time domain resource subsets.

In one subembodiment of the above three embodiments, the blind decoding includes: a given second time domain resource subset is any of the M1 second time domain resource subsets, the given second time domain resource subset comprises a positive integer number of candidates that may transmit SCI, the first node is not aware which candidate the SCI occupies before the SCI is detected.

In one subembodiment of the above three embodiments, the blind decoding includes: a candidate which may be occupied by a piece of SCI has a tree structure.

In one embodiment, a physical layer channel occupied by the first radio signal includes a PSFCH.

In one embodiment, the first time-frequency resource set comprises a positive integer number of REs.

In one embodiment, a second time domain resource set comprises M1 second time domain resource subsets, the K1 first-type signalings are respectively transmitted in K1 of the M1 second time domain resource subsets; a transmitter of the K1 first-type signalings is a second node, the second node transmits M1 first-type signalings respectively in the M1 second time domain resource subsets, any of the K1 first-type signalings is one of the M1 first-type signalings; the first node detects the K1 of the M1 first-type signalings; the M1 is a positive integer not less than the K1.

In one subembodiment, any of the M1 second time domain resource subsets occupies a positive integer number of multicarrier symbol(s) in time domain.

In one subembodiment, any of the M1 second time domain resource subsets comprises a search space for SCI.

In one subembodiment, any of the M1 second time domain resource subsets comprises a Control Resource Set (CORESET) for SCI.

In one subembodiment, each of the M1 first-type signalings indicates the first time-frequency resource set.

In one subembodiment, each of the M1 second time domain resource subsets is associated to the first time-frequency resource set.

In one subembodiment, the M1 is greater than the K1, the first node does not correctly detect M1−K1 first-type signaling(s) of the M1 first-type signalings.

In one subsidiary embodiment of the above subembodiment, the first signaling is a last first-type signaling of the M1 first-type signalings in time domain; the first radio signal is used for determining that there is(are) first-type signaling(s) not having been correctly decoded in the M1 first-type signalings; or, the first radio signal is used for determining that there is not any first-type signaling not having been correctly decoded in the M1 first-type signalings, and at least one of the M1 first-type signalings schedules a bit block that is not decoded correctly.

In one subsidiary embodiment of the above subembodiment, among the M1 first-type signalings there is a first-type signaling located after the first signaling in time domain, the second node has transmitted a total of K2 first-type signalings in a time domain position before the first signaling, the K2 is a positive integer greater than the K1 and less than the M1; the first signaling is a last first-type signaling of the K2 first-type signalings in time domain; the first radio signal is used for determining that there is(are) first-type signaling(s) not having been correctly decoded in the K2 first-type signalings; or, the first radio signal is used for determining that there is not any first-type signaling not having been correctly decoded in the K2 first-type signalings, and at least one of the K2 first-type signalings schedules a bit block that is not decoded correctly.

In one example of the above subsidiary embodiment, the second node determines according to the first radio signal whether (M1-K2) first-type signaling(s) of the M1 first-type signalings located after the first signaling in time domain is(are) detected by the first node.

Embodiment 2

Figure 2:
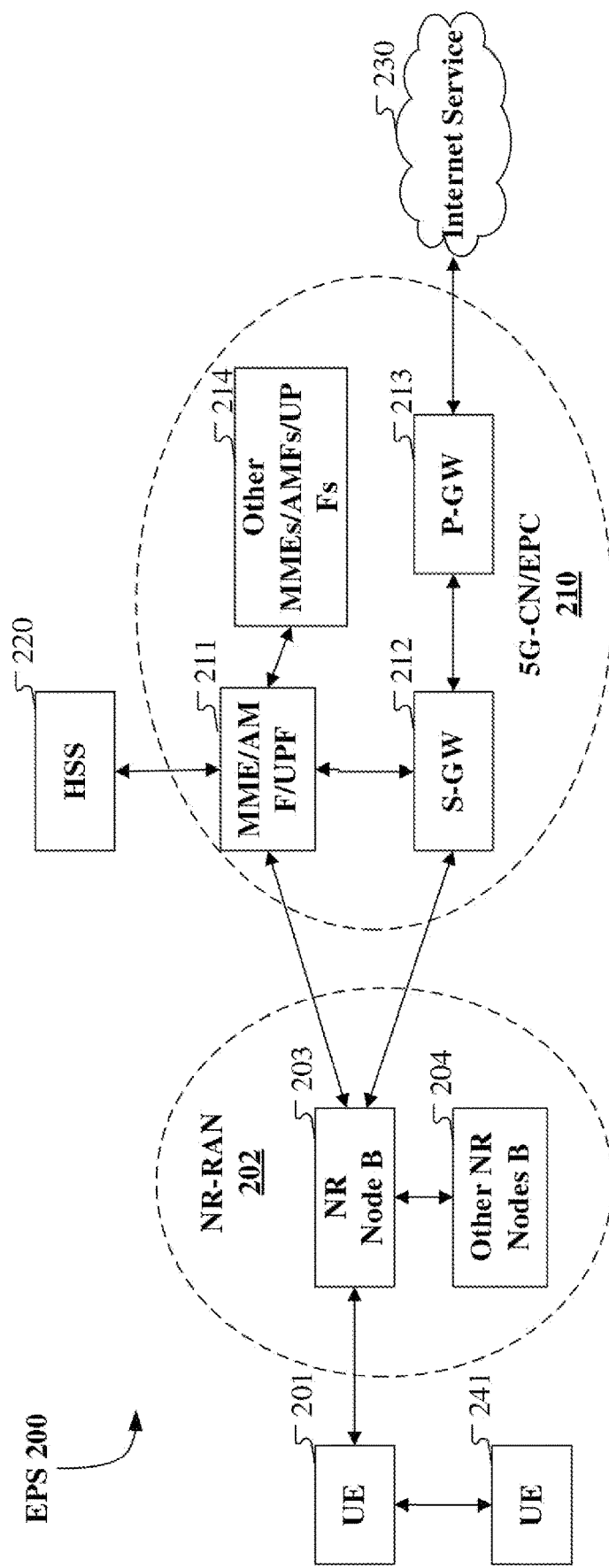
FIG. 2 illustrates a schematic diagram of a network architecture according to one embodiment of the present disclosure.

Embodiment 2 illustrates a schematic diagram of a network architecture, as shown in FIG. 2.

FIG. 2 is a diagram illustrating a network architecture 200 of 5G NR, Long-Term Evolution (LTE) and Long-Term Evolution Advanced (LTE-A) systems. The 5G NR or LTE network architecture 200 may be called an Evolved Packet System (EPS) 200 or other applicable terminology. The EPS 200 may comprise one or more UEs 201, and a UE 241 in sidelink communication with the UE 201, an NG-RAN 202, an Evolved Packet Core/5G-Core Network (EPC/5G-CN) 210, a Home Subscriber Server (HSS) 220 and an Internet Service 230. The EPS 200 may be interconnected with other access networks. For simple description, the entities/interfaces are not shown. As shown in FIG. 2, the EPS 200 provides packet switching services. Those skilled in the art will find it easy to understand that various concepts presented throughout the present disclosure can be extended to networks providing circuit switching services or other cellular networks. The NG-RAN 202 comprises an NR node B (gNB) 203 and other gNBs 204. The gNB 203 provides UE 201 oriented user plane and control plane protocol terminations. The gNB 203 may be associated to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmit-Receive Point (TRP) or some other applicable terms. The gNB 203 provides an access point of the EPC/5G-CN 210 for the UE 201. Examples of UE 201 include cellular phones, smart phones, Session Initiation Protocol (SIP) phones, laptop computers, Personal Digital Assistant (PDA), Satellite Radios, non-terrestrial base station communications, Satellite Mobile Communications, Global Positioning Systems (GPSs), multimedia devices, video devices, digital audio players (for example, MP3 players), cameras, game consoles, unmanned aerial vehicles, air vehicles, narrow-band physical network equipment, machine-type communication equipment, land vehicles, automobiles, wearable equipment, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is associated to the EPC/5G-CN 210 via an S1/NG interface. The EPC/5G-CN 210 comprises a Mobility Management Entity/Authentication Management Field/User Plane Function (MME/AMF/UPF) 211, other MMEs/AMFs/UPFs 214, a Service Gateway (S-GW) 212 and a Packet Date Network Gateway (P-GW) 213. The MME/AMF/UPF 211 is a control node for processing a signaling between the UE 201 and the EPC/5G-CN 210. Generally, the MME/AMF/UPF 211 provides bearer and connection management. All user Internet Protocol (IP) packets are transmitted through the S-GW 212, the S-GW 212 is associated to the P-GW 213. The P-GW 213 provides UE IP address allocation and other functions. The P-GW 213 is associated to the Internet Service 230. The Internet Service 230 comprises IP services corresponding to operators, specifically including Internet, Intranet, IP Multimedia Subsystem (IMS) and Packet Switching Streaming Services (PSS).

In one embodiment, the UE 201 corresponds to the first node in the present disclosure.

In one embodiment, the UE 241 corresponds to the second node in the present disclosure.

In one embodiment, an air interface between the UE 201 and the gNB 203 is a Uu interface.

In one embodiment, an air interface between the UE 201 and the UE 241 is a PC-5 interface.

In one embodiment, a radio link between the UE 201 and the gNB 203 is a cellular network link.

In one embodiment, a radio link between the UE 201 and the UE 241 is a sidelink.

In one embodiment, the first node in the present disclosure is the UE 201, while the second node in the present disclosure is a terminal covered by the gNB 203.

In one embodiment, the first node in the present disclosure is the UE 201, while the second node in the present disclosure is a terminal uncovered by the gNB 203.

In one embodiment, the first node and the second node in the present disclosure are both served by the gNB 203.

In one embodiment, unicast communication is supported between the UE 201 and the UE 241.

In one embodiment, broadcast communication is supported between the UE 201 and the UE 241.

In one embodiment, groupcast communication is supported between the UE 201 and the UE 241.

In one embodiment, the UE 201 and the UE 241 belong to a same terminal group, the UE 241 is the group manager for the terminal group, or the UE 241 is the group head of the terminal group.

Embodiment 3

Figure 3:
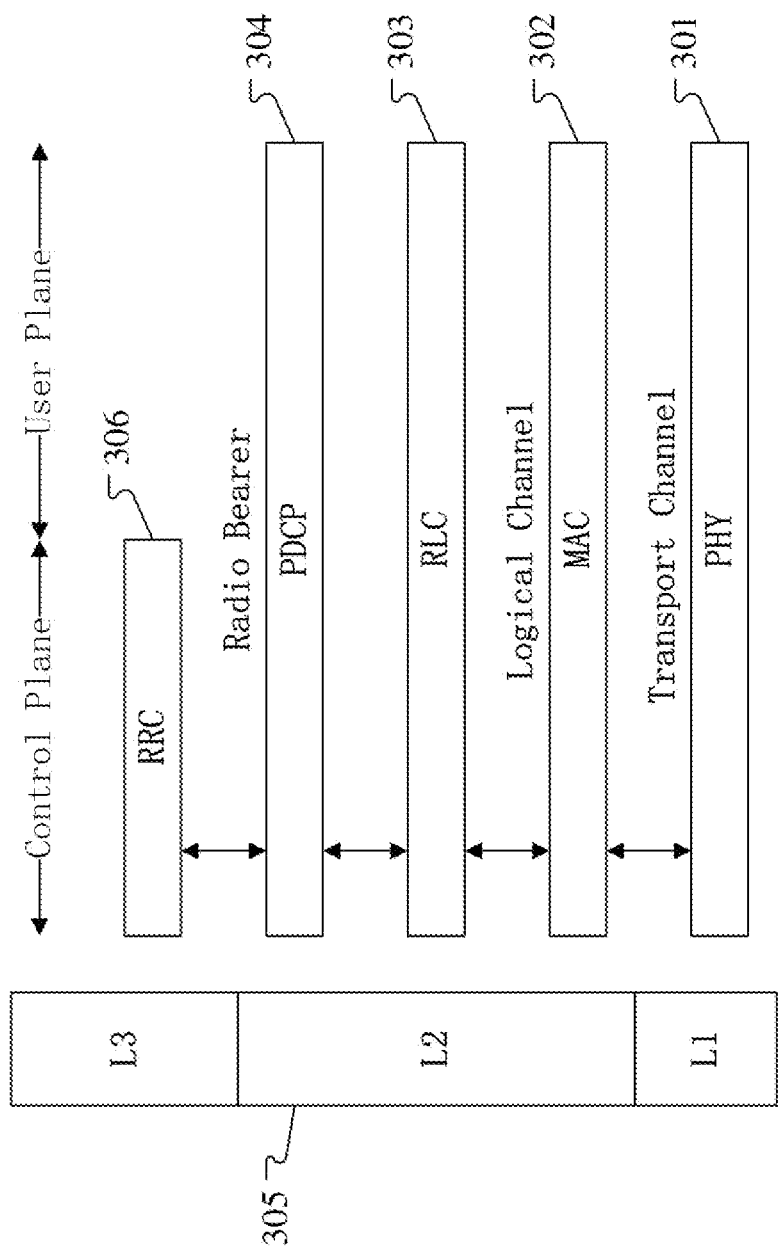
FIG. 3 illustrates a schematic diagram of an example of a radio protocol architecture of a user plane and a control plane according to one embodiment of the present disclosure.

Embodiment 3 illustrates a schematic diagram of an embodiment of a radio protocol architecture of a user plane and a control plane according to the present disclosure, as shown in FIG. 3.

FIG. 3 is a schematic diagram illustrating an embodiment of a radio protocol architecture of a user plane and a control plane. In FIG. 3, the radio protocol architecture for a first node and a second node is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of the link between the first node and the second node via the PHY 301. In the user plane, L2 305 comprises a Medium Access Control (MAC) sublayer 302, a Radio Link Control (RLC) sublayer 303 and a Packet Data Convergence Protocol (PDCP) sublayer 304. All the three sublayers terminate at the second node of the network side. Although not described in FIG. 3, the first node may comprise several higher layers above the L2 305, such as a network layer (i.e., IP layer) terminated at a P-GW 213 of the network side and an application layer terminated at the other side of the connection (i.e., a peer UE, a server, etc.). The PDCP sublayer 304 provides multiplexing among variable radio bearers and logical channels. The PDCP sublayer 304 also provides a header compression for a higher-layer packet so as to reduce a radio transmission overhead. The PDCP sublayer 304 provides security by encrypting a packet and provides support for UE handover between second nodes. The RLC sublayer 303 provides segmentation and reassembling of a higher-layer packet, retransmission of a lost packet, and reordering of a packet so as to compensate the disordered receiving caused by HARQ. The MAC sublayer 302 provides multiplexing between a logical channel and a transport channel. The MAC sublayer 302 is also responsible for allocating between first nodes various radio resources (i.e., resource blocks) in a cell. The MAC sublayer 302 is also in charge of HARQ operation. In the control plane, the radio protocol architecture of the first node and the second node is almost the same as the radio protocol architecture in the user plane on the PHY 301 and the L2 305, but there is no header compression for the control plane. The control plane also comprises a Radio Resource Control (RRC) sublayer 306 in the layer 3 (L3). The RRC sublayer 306 is responsible for acquiring radio resources (i.e., radio bearer) and configuring the lower layer using an RRC signaling between the second node and the first node.

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, any of the M1 first-type signalings in the present disclosure is generated by the PHY 301.

In one embodiment, the first radio signal in the present disclosure is generated by the PHY 301.

In one embodiment, the first radio signal in the present disclosure is generated by the MAC sublayer 302.

In one embodiment, the first information in the present disclosure is generated by the MAC sublayer 302.

In one embodiment, the first information in the present disclosure is generated by the RRC sublayer 306.

In one embodiment, the first information in the present disclosure is generated by an affiliated base station of a cell where the second node is located.

In one embodiment, any of the M1 radio signals in the present disclosure is generated by the MAC sublayer 302.

In one embodiment, any of the M1 radio signals in the present disclosure is generated by the PHY 301.

Embodiment 4

Figure 4:
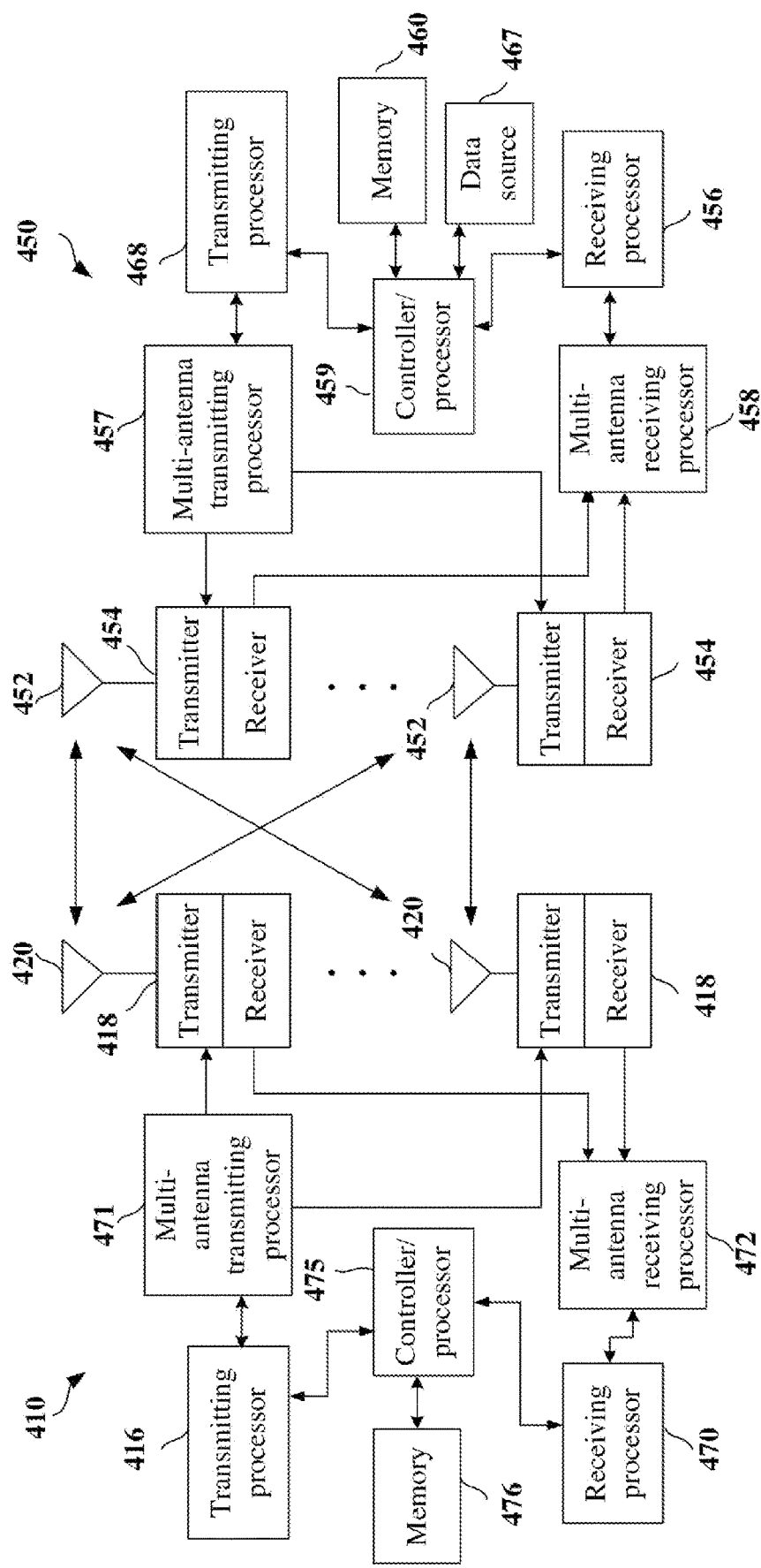
FIG. 4 illustrates a schematic diagram of a first node and a second node according to one embodiment of the present disclosure.

Embodiment 4 illustrates a schematic diagram of a first node (first communication device) and a second node (second communication device) according to the present disclosure, as shown in FIG. 4. FIG. 4 is a block diagram of a first communication device 450 and a second communication device in communication with each other in an access network.

The first communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

The second communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

In a transmission between the second communication device 410 and the first communication device 450, at the second communication device 410, a higher layer packet from a core network is provided to the controller/processor 475. The controller/processor 475 implements the functionality of the L2 layer. The controller/processor 475 provides header compression, encryption, packet segmentation and reordering, and multiplexing between a logical channel and a transport channel, and radio resource allocation of the first communication device 450 based on various priorities. The controller/processor 475 is also in charge of a retransmission of a lost packet and a signaling to the first communication device 450. The transmitting processor 416 and the multi-antenna transmitting processor 471 perform various signal processing functions used for the L1 layer (i.e., PHY). The transmitting processor 416 performs coding and interleaving so as to ensure a Forward Error Correction (FEC) at the second communication device 410 side and the mapping to signal clusters corresponding to each modulation scheme (i.e., BPSK, QPSK, M-PSK, and M-QAM, etc.). The multi-antenna transmitting processor 471 performs digital spatial precoding, which includes precoding based on codebook and precoding based on non-codebook, and beamforming processing on encoded and modulated signals to generate one or more spatial streams. The transmitting processor 416 then maps each spatial stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multicarrier symbol streams. After that the multi-antenna transmitting processor 471 performs transmission analog precoding/beamforming on the time-domain multicarrier symbol streams. Each transmitter 418 converts a baseband multicarrier symbol stream provided by the multi-antenna transmitting processor 471 into a radio frequency (RF) stream, which is later provided to different antennas 420.

In a transmission between the second communication device 410 and the first communication device 450, at the first communication device 450, each receiver 454 receives a signal via a corresponding antenna 452. Each receiver 454 recovers information modulated to the RF carrier, and converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs reception analog precoding/beamforming on a baseband multicarrier symbol stream provided by the receiver 454. The receiving processor 456 converts the processed baseband multicarrier symbol stream from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any first communication device 450-targeted spatial stream. Symbols on each spatial stream are demodulated and recovered in the receiving processor 456 to generate a soft decision. Then the receiving processor 456 decodes and de-interleaves the soft decision to recover the higher-layer data and control signal transmitted by the second communication device 410 on the physical channel. Next, the higher-layer data and control signal are provided to the controller/processor 459. The controller/processor 459 performs functions of the L2 layer. The controller/processor 459 can be associated to a memory 460 that stores program code and data. The memory 460 can be called a computer readable medium. In a transmission between the second communication device 410 and the first communication device 450, the controller/processor 459 provides demultiplexing between a transport channel and a logical channel, packet reassembling, decrypting, header decompression and control signal processing so as to recover a higher-layer packet from the core network. The higher-layer packet is later provided to all protocol layers above the L2 layer, or various control signals can be provided to the L3 layer for processing.

In a transmission between the first communication device 450 and the second communication device 410, at the first communication device 450, the data source 467 is configured to provide a higher-layer packet to the controller/processor 459. The data source 467 represents all protocol layers above the L2 layer. Similar to a transmitting function of the second communication device 410 described in the transmission between the second communication device 410 and the first communication device 450, the controller/processor 459 performs header compression, encryption, packet segmentation and reordering, and multiplexing between a logical channel and a transport channel based on radio resource allocation so as to provide the L2 layer functions used for the user plane and the control plane. The controller/processor 459 is also responsible for a retransmission of a lost packet, and a signaling to the second communication device 410. The transmitting processor 468 performs modulation and mapping, as well as channel coding, and the multi-antenna transmitting processor 457 performs digital multi-antenna spatial precoding, including precoding based on codebook and precoding based on non-codebook, and beamforming. The transmitting processor 468 then modulates generated spatial streams into multicarrier/single-carrier symbol streams. The modulated symbol streams, after being subjected to analog precoding/beamforming in the multi-antenna transmitting processor 457, are provided from the transmitter 454 to each antenna 452. Each transmitter 454 first converts a baseband symbol stream provided by the multi-antenna transmitting processor 457 into a radio frequency symbol stream, and then provides the radio frequency symbol stream to the antenna 452.

In a transmission between the first communication device 450 and the second communication device 410, the function of the second communication device 410 is similar to the receiving function of the first communication device 450 described in the transmission between the second communication device 410 and the first communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and the multi-antenna receiving processor 472 jointly provide functions of the L1 layer. The controller/processor 475 provides functions of the L2 layer. The controller/processor 475 can be associated to the memory 476 that stores program code and data. The memory 476 can be called a computer readable medium. In the transmission between the first communication device 450 and the second communication device 410, the controller/processor 475 provides de-multiplexing between a transport channel and a logical channel, packet reassembling, decrypting, header decompression, control signal processing so as to recover a higher-layer packet from the first communication device (UE) 450. The higher-layer packet coming from the controller/processor 475 may be provided to the core network.

In one embodiment, the first communication device 450 comprises at least one processor and at least one memory. The at least one memory includes computer program codes. The at least one memory and the computer program codes are configured to be used in collaboration with the at least one processor. The first communication device 450 at least performs a monitoring on first-type signalings, in which K1 first-type signalings are detected; and transmits a first radio signal in a first time-frequency resource set; each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; the K1 is a positive integer.

In one embodiment, the first communication device 450 comprises at least one processor and at least one memory. The at least one memory includes computer program codes. The at least one memory and the computer program codes are configured to be used in collaboration with the at least one processor. The first communication device 450 at least performs a monitoring on first-type signalings, in which K1 first-type signalings are detected; and transmits a first radio signal in a first time-frequency resource set; each of the K1 first-type signalings is associated to the first time-frequency resource set; a first signaling is a last first-type signaling of the K1 first-type signalings in time domain; the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

In one embodiment, the first communication device 450 comprises a memory that stores a computer readable instruction program. The computer readable instruction program generates an action when executed by at least one processor. The action includes: performing a monitoring on first-type signalings, in which K1 first-type signalings are detected; and transmitting a first radio signal in a first time-frequency resource set; each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; the K1 is a positive integer.

In one embodiment, the first communication device 450 comprises a memory that stores a computer readable instruction program. The computer readable instruction program generates an action when executed by at least one processor. The action includes: performing a monitoring on first-type signalings, in which K1 first-type signalings are detected; and transmitting a first radio signal in a first time-frequency resource set; each of the K1 first-type signalings is associated to the first time-frequency resource set; a first signaling is a last first-type signaling of the K1 first-type signalings in time domain; the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits M1 first-type signalings; and monitors a first radio signal in a first time-frequency resource set; each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; the K1 is a positive integer, and the M1 is a positive integer not less than the K1.

In one embodiment, the second communication device 410 comprises at least one processor and at least one memory. The at least one memory includes computer program codes. The at least one memory and the computer program codes are configured to be used in collaboration with the at least one processor. The second communication device 410 at least transmits M1 first-type signalings; and monitors a first radio signal in a first time-frequency resource set; each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is not any first-type signaling associated to the first time-frequency resource set not having been correctly decoded by the first node in a time domain position before the first signaling, and at least one of the K1 first-type signalings schedules a bit block that is not decoded correctly by the first node; the K1 is a positive integer, and the M1 is a positive integer not less than the K1.

In one embodiment, the second communication device 410 comprises a memory that stores a computer readable instruction program. The computer readable instruction program generates an action when executed by at least one processor. The action includes: transmitting M1 first-type signalings; and monitoring a first radio signal in a first time-frequency resource set; each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; the K1 is a positive integer, and the M1 is a positive integer not less than the K1.

In one embodiment, the second communication device 410 comprises a memory that stores a computer readable instruction program. The computer readable instruction program generates an action when executed by at least one processor. The action includes: transmitting M1 first-type signalings; and monitoring a first radio signal in a first time-frequency resource set; each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is not any first-type signaling associated to the first time-frequency resource set not having been correctly decoded by the first node in a time domain position before the first signaling, and at least one of the K1 first-type signalings schedules a bit block that is not decoded correctly by the first node; the K1 is a positive integer, and the M1 is a positive integer not less than the K1.

In one embodiment, the first communication device 450 corresponds to the first node in the present disclosure.

In one embodiment, the second communication device 410 corresponds to the second node in the present disclosure.

In one embodiment, at least one of the antenna 452, the receiver 454, the multi-antenna receiving processor 458 or the receiving processor 456 is used for performing a monitoring on first-type signalings, in which K1 first-type signalings are detected.

In one embodiment, at least one of the antenna 420, the transmitter 418, the multi-antenna transmitting processor 471 or the transmitting processor 416 is used for transmitting M1 first-type signalings.

In one embodiment, at least one of the antenna 452, the transmitter 454, the multi-antenna transmitting processor 457, the transmitting processor 468 or the controller/processor 459 is used for transmitting a first radio signal in a first time-frequency resource set; at least one of the antenna 420, the receiver 418, the multi-antenna receiving processor 472, the receiving processor 470 or the controller/processor 475 is used for monitoring a first radio signal in a first time-frequency resource set.

In one embodiment, at least one of the antenna 452, the receiver 454, the multi-antenna receiving processor 458 or the receiving processor 456 is used for receiving first information; at least one of the antenna 420, the transmitter 418, the multi-antenna transmitting processor 471 or the transmitting processor 416 is used for transmitting first information.

In one embodiment, at least one of the antenna 452, the receiver 454, the multi-antenna receiving processor 458 or the receiving processor 456 is used for receiving K1 radio signals; at least one of the antenna 420, the transmitter 418, the multi-antenna transmitting processor 471 or the transmitting processor 416 is used for transmitting K1 radio signals.

Embodiment 5

Figure 5:
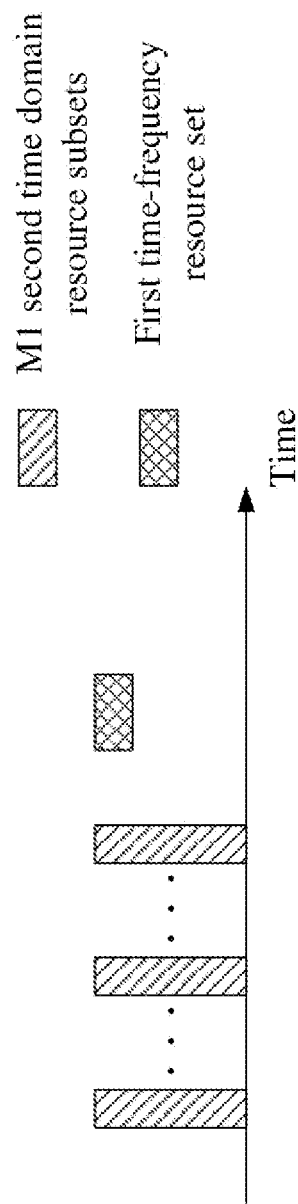
FIG. 5 illustrates a flowchart of a first radio signal according to one embodiment of the present disclosure.

Embodiment 5 illustrates a flowchart of a first radio signal, as shown in FIG. 5. In FIG. 5, a first node U1 and a second node U2 are in communication with each other via sidelink. Steps marked by FO in FIG. 5 are optional.

The first node U1 receives first information in step S10; performs a monitoring on first-type signalings in step S11, in which K1 first-type signalings are detected; receives K1 radio signals in step S12; and transmits a first radio signal in a first time-frequency resource set in step S13.

The second node U2 transmits first information in step S20; transmits M1 first-type signalings in step S21; transmits M1 radio signals in step S22; and monitors a first radio signal in a first time-frequency resource set in step S23.

In Embodiment 5, each of the M1 first-type signalings is associated to the first time-frequency resource set, any of the K1 first-type signalings is one of the M1 first-type signalings that is detected by the first node U1; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; or, the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer; the M1 is a positive integer not less than the K1; the first information is used for indicating a second time domain resource set, the M1 first-type signalings respectively occupy M1 second time domain resource subsets in time domain, the second time domain resource set comprises the M1 second time domain resource subsets; the K1 first-type signalings are transmitted by the second node U2 respectively in K1 of the M1 second time domain resource subsets; the M1 first-type signalings are respectively used for scheduling the M1 radio signals, M1 bit blocks are used for generating the M1 radio signals; the K1 radio signals are K1 of the M1 radio signals respectively generated by K1 bit blocks scheduled by the K1 first-type signalings.

In one embodiment, the meaning of the phrase in the present disclosure that each of the K1 first-type signalings is associated to the first time-frequency resource set includes: the K1 is greater than 1, each of the K1 first-type signalings indicates the first time-frequency resource set.

In one subembodiment, the above-mentioned phrase that each of the K1 first-type signalings indicates the first time-frequency resource set means that each of the K1 first-type signalings comprises a second field, the second field is used for indicating a position of time domain resources occupied by the first time-frequency resource set.

In one subembodiment, the above-mentioned phrase that each of the K1 first-type signalings indicates the first time-frequency resource set means that each of the K1 first-type signalings comprises a second field, the second field is used for indicating a position of frequency domain resources occupied by the first time-frequency resource set.

In one embodiment, the meaning of the phrase in the present disclosure that each of the K1 first-type signalings is associated to the first time-frequency resource set includes: time domain resources occupied by each of the K1 first-type signalings belong to a second time domain resource set, the second time domain resource set is associated to the first time-frequency resource set.

In one subembodiment, the meaning of the above-mentioned phrase that the second time domain resource set is associated to the first time-frequency resource set includes: the second node of the present disclosure indicates via a higher layer signaling that the second time domain resource set is to be associated to the first time-frequency resource set.

In one subembodiment, the meaning of the above-mentioned phrase that the second time domain resource set is associated to the first time-frequency resource set includes: the second time domain resource set is pre-defined to be associated to the first time-frequency resource set.

In one subembodiment, the meaning of the above-mentioned phrase that the second time domain resource set is associated to the first time-frequency resource set includes: the Hybrid Automatic Repeat request Acknowledgement (HARQ-ACK) of a data channel scheduled by a scheduling signaling detected in the second time domain resource set is transmitted in the first time-frequency resource set.

In one embodiment, a first bit is used for generating the first radio signal; the first bit is used for determining that there is(are) first-type signaling(s) associated to the first time-frequency resource set not having been correctly decoded in a time domain position before the first signaling.

In one subembodiment, the first bit being equal to 1 is used for determining that there is(are) first-type signaling(s) associated to the first time-frequency resource set not having been correctly decoded in a time domain position before the first signaling.

In one subembodiment, the first bit being equal to 0 is used for determining that there is not any first-type signaling associated to the first time-frequency resource set not having been correctly decoded in a time domain position before the first signaling.

In one embodiment, a first bit is used for generating the first radio signal; the first bit is used for determining that there is not any first-type signaling associated to the first time-frequency resource set not having been correctly decoded in a time domain position before the first signaling, and at least one of the K1 first-type signalings schedules a bit block that is not decoded correctly.

In one subembodiment, the first bit being equal to 0 is used for determining that there is not any first-type signaling associated to the first time-frequency resource set not having been correctly decoded in a time domain position before the first signaling, and at least one of the K1 first-type signalings schedules a bit block that is not decoded correctly.

In one subembodiment of the above two embodiments, the first radio signal is generated through the first bit only.

In one subembodiment of the above two embodiments, the first bit is used for generating a first sequence, the first sequence is used for generating the first radio signal.

In one subsidiary embodiment of the above subembodiment, the first sequence is a characteristic sequence, a demodulation of the first sequence is coherent demodulation.

In one subembodiment of the above two embodiments, the first bit is not detected by the second node U2, the second node U2 assumes that there is not any first-type signaling associated to the first time-frequency resource set not having been correctly decoded in a time domain position before the first signaling, and any of the K1 first-type signalings schedules a bit block having been correctly decoded.

In one embodiment, a first bit is used for generating the first radio signal; the first bit is used for determining that there is(are) first-type signaling(s) associated to the first time-frequency resource set not having been correctly decoded in a time domain position before the first signaling, or, the first bit is used for determining that there is not any first-type signaling associated to the first time-frequency resource set not having been correctly decoded in a time domain position before the first signaling, and at least one of the K1 first-type signalings schedules a bit block that is not decoded correctly.

In one subembodiment, the first bit being equal to 1 represents that there is(are) first-type signaling(s) associated to the first time-frequency resource set not having been correctly decoded in a time domain position before the first signaling; the first bit being equal to 0 represents that there is not any first-type signaling associated to the first time-frequency resource set not having been correctly decoded in a time domain position before the first signaling, and at least one of the K1 first-type signalings schedules a bit block that is not decoded correctly.

In one subembodiment, the first bit being equal to 0 represents that there is(are) first-type signaling(s) associated to the first time-frequency resource set not having been correctly decoded in a time domain position before the first signaling; the first bit being equal to 1 represents that there is not any first-type signaling associated to the first time-frequency resource set not having been correctly decoded in a time domain position before the first signaling, and at least one of the K1 first-type signalings schedules a bit block that is not decoded correctly.

In one embodiment, a second bit sequence is used for generating the first radio signal; the second bit sequence comprises K2 bits, the K2 is a positive integer not less than the K1; K2 second time domain resource subsets are associated to the first time-frequency resource sets, the K1 first-type signalings are transmitted by the second node U2 respectively in K1 of the K2 second time domain resource subsets; the K2 bits are used for determining that K3 first-type signaling(s) is(are) not correctly decoded, the K3 first-type signaling(s) is(are) transmitted by the second node U2 respectively in K3 second time domain resource subset(s) out of the K2 second time domain resource subsets other than the K1 second time domain resource subsets, the K3 is a difference between the K2 and the K1.

In one subembodiment of the above embodiment, the K2 second time domain resource subsets are the first K2 second time domain resource subsets of the M1 second time domain resource subsets in time domain; the second node U2 transmits the first signaling in a last second time domain resource subset of the K2 second time domain resource subsets, and the first node U1 correctly decodes the first signaling.

In one subembodiment of the above embodiment, the (K2-1) bit(s) of the K2 bits is(are) used for determining that K3 of the K2 first-type signalings is(are) not correctly decoded, and a last bit of the K2 bits is used for checking the second bit sequence; the second bit sequence is scrambled by a first characteristic sequence.

In one subembodiment of the above embodiment, the second node U2 descrambles through the first characteristic sequence and the first radio signal is correctly decoded, the second node U2 assumes that there is(are) first-type signaling(s) associated to the first time-frequency resource set not having been correctly decoded by the first node U1 in a time domain position before the first signaling.

In one subembodiment of the above embodiment, the first radio signal comprises a target field, the target field is used for indicating that the K2 bits comprised by the first radio signal are to indicate that K3 of the K2 first-type signaling(s) is(are) not correctly decoded.

In one subsidiary embodiment of the above subembodiment, the target field comprises 1 bit, the 1 bit comprised in the target field being equal to 1 represents that the K2 bits are used for indicating that K3 of the K2 first-type signalings is(are) not correctly decoded.

In one subsidiary embodiment of the above subembodiment, a given bit is any of the first (K2-1) bit(s); the given bit being equal to 1 represents that a corresponding first-type signaling is not correctly decoded, while the given bit being equal to 0 represents that the corresponding first-type signaling is correctly decoded.

In one embodiment, a second bit sequence is used for generating the first radio signal; the second bit sequence comprises K2 bits, the K2 is a positive integer not less than the K1; K2 second time domain resource subsets are associated to the first time-frequency resource sets, the K1 first-type signalings are transmitted by the second node U2 respectively in K1 of the K2 second time domain resource subsets; the K2 bits are used for determining that K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

In one subembodiment of the above embodiment, the K2 second time domain resource subsets are the first K2 second time domain resource subsets of the M1 second time domain resource subsets in time domain; the second node U2 transmits the first signaling in a last second time domain resource subset of the K2 second time domain resource subsets, and the first node U1 correctly decodes the first signaling.

In one subembodiment of the above embodiment, the K2 bits are respectively associated to K2 bit blocks scheduled by the K2 first-type signalings, the K2 bits are used for determining that the K4 bit block(s) of the K2 bit blocks is(are) not correctly decoded.

In one subsidiary embodiment of the above subembodiment, a given bit is the any bit of the K2 bits; the given bit being equal to 1 represents that a corresponding bit block is not correctly decoded, while the given bit being equal to 0 represents that a corresponding bit block is correctly decoded.

In one subembodiment of the above embodiment, the second bit sequence is scrambled through a second characteristic sequence, the second characteristic sequence is orthogonal with the first characteristic sequence in the present disclosure.

In one subembodiment of the above embodiment, the second node U2 descrambles through the second characteristic sequence and the first radio signal is correctly decoded, the second node U2 assumes that there is not any first-type signaling associated to the first time-frequency resource set not having been correctly decoded by the first node U1 in a time domain position before the first signaling, and at least one of the K1 first-type signalings schedules a bit block that is not decoded correctly by the first node U1.

In one subembodiment of the above embodiment, the first radio signal comprises a target field, the target field is used for indicating that the K2 bits comprised in the first radio signal are to indicate that the K4 bit block(s) is(are) not correctly decoded.

In one subsidiary embodiment of the above subembodiment, the target field comprises 1 bit, the 1 bit comprised in the target field being equal to 0 represents that the K2 bits are used for indicating that the K2 bits comprised in the first radio signal are to indicate that the K4 bit block(s) is(are) not correctly decoded.

In one embodiment, the second node U2 does not correctly detect the first radio signal, the second node U2 assumes that all the M1 first-type signalings are correctly detected by the first node U1, and the K1 bit blocks respectively scheduled by the M1 first-type signalings are correctly decoded by the first node U1.

In one embodiment, the phrase in the present disclosure that at least one of the K1 first-type signalings schedules a bit block that is not decoded correctly means that there is at least one given radio signal in the K1 radio signals, the given radio signal comprises a CRC sequence, the first node determines through the check on the CRC sequence that a bit block that generates the given radio signal is not correctly decoded.

In one embodiment, the phrase in the present disclosure that at least one of the K1 first-type signalings schedules a bit block that is not decoded correctly means that there is at least one given radio signal in the K1 radio signals, the given radio signal comprises a CRC sequence; the first node, after receiving the given radio signal, employs the CRC sequence comprised by the received given radio signal in the Mod 2 Division of the Cyclic Generation Polynomial of the CRC sequence, which yields a remainder unequal to 0, then the first node assumes that the bit block which generates the given radio signal is not correctly decoded.

In one embodiment, the phrase in the present disclosure that at least one of the K1 first-type signalings schedules a bit block that is not decoded correctly means that there is at least one given radio signal in the K1 radio signals, a power value of the given radio signal received by the first node is less than a second threshold, the first node assumes that the bit which generates the given radio signal is not correctly decoded.

In one embodiment, the M1 bit blocks are respectively used for generating M1 Transmission Blocks (TBs).

In one embodiment, the M1 bit blocks are respectively used for generating M1 Code Block Groups (CBGs).

In one embodiment, a physical layer channel occupied by any of the M1 radio signals is a Physical Sidelink Shared Channel (PSSCH).

In one embodiment, a transport channel occupied by any of the M1 radio signals is a Sidelink Shared Channel (SL-SCH).

In one embodiment, the phrase in the present disclosure that the first field is used for determining a sequence number of the given first-type signaling in the M1 first-type signalings includes: the first field is used for determining where the given first-type signaling ranks in the M1 first-type signalings.

In one embodiment, the phrase in the present disclosure that the first field is used for determining a sequence number of the given first-type signaling in the M1 first-type signalings includes: the given first-type signaling ranks the i-th in the M1 first-type signalings, the first field is used for indicating (i−1), the i is an integer no less than 0 and less than M1.

In one embodiment, the first signaling is the K2-th first-type signaling of the M1 first-type signalings, a first field comprised in the first signaling indicates (K2-1), the first field of the first signaling indicates that the first signaling is the K2-th first-type signaling of all first-type signalings associated to the first time-frequency resource set; the K2 is a positive integer no less than the K1.

In one subembodiment, the first node U1 transmits the first radio signal in the first time-frequency resource set, the first radio signal only comprises the first bitmap; when the K2 is equal to the M1, the second node U2 determines that the first node U1 does not miss detection on remaining first-type signaling(s) associated to the first time-frequency resource set after detecting the first signaling; or when the K2 is less than the M1, the second node U2 determines that the first node U1 misses detection on remaining first-type signaling(s) associated to the first time-frequency resource set after detecting the first signaling; the remaining first-type signaling(s) is(are) (M1−K2) first-type signaling(s) out of the M1 first-type signalings located after the first signaling in time domain.

In one subembodiment, the first node U1 transmits the first radio signal in the first time-frequency resource set, the first radio signal comprises the first bitmap and the second bitmap; the first radio signal also comprises a target field, the target field is used for indicating the K2; when the K2 is equal to the M1, the second node U2 determines that the first node U1 does not miss detection on remaining first-type signaling(s) associated to the first time-frequency resource set after detecting the first signaling; or when the K2 is less than the M1, the second node U2 determines that the first node U1 misses detection on remaining first-type signaling(s) associated to the first time-frequency resource set after detecting the first signaling; the remaining first-type signaling(s) is(are) (M1-K2) first-type signaling(s) out of the M1 first-type signalings located after the first signaling in time domain.

In one embodiment, the first radio signal comprises a target field, the target field is used for indicating a number of bits comprised by the first bitmap.

In one embodiment, the first radio signal comprises a target field, the target field is used for indicating the K2.

In one embodiment, the first field comprises Q1 bit(s), the Q1 is a minimum positive integer not less than log 2(M1).

In one embodiment, the multicarrier symbol in the present disclosure is an Orthogonal Frequency Division Multiplexing (OFDM) symbol.

In one embodiment, the multicarrier symbol in the present disclosure is a Single-Carrier Frequency Division Multiple Access (SC-FDMA) symbol.

In one embodiment, the multicarrier symbol in the present disclosure is a Filter Bank Multi Carrier (FBMC) symbol.

In one embodiment, the multicarrier symbol in the present disclosure is a Cyclic Prefix (CP)-including OFDM symbol.

In one embodiment, the multicarrier symbol in the present disclosure is one of CP-including Discrete Fourier Transform Spreading Orthogonal Frequency Division Multiplexing (DFT-s-OFDM) symbols.

In one embodiment, the first information is transmitted via an RRC signaling.

In one embodiment, the first information is information for a PC-5 interface.

In one embodiment, the first node U1 is a terminal.

In one embodiment, the first node U1 is a UE.

In one embodiment, the first node U1 is a vehicle.

In one embodiment, the first node U1 is a Road Side Unit (RSU).

In one embodiment, the first node U2 is a terminal.

In one embodiment, the first node U2 is a UE.

In one embodiment, the first node U2 is a vehicle.

In one embodiment, the first node U2 is an RSU.

In one embodiment, a given terminal group comprises the first node U1 and the second node U2, the first node U1 is a terminal of the given terminal group; the second node U2 is a Group Head (GH), or the second node U2 is a Group Manager (GM).

In one embodiment, the meaning of the phrase that monitoring a first radio signal in a first time-frequency resource set includes: the second node U2 detects the first radio signal in the first time-frequency resource set.

In one embodiment, the meaning of the phrase that monitoring a first radio signal in a first time-frequency resource set includes: the second node U2 successfully decodes the first radio signal in the first time-frequency resource set.

In one embodiment, the meaning of the phrase that monitoring a first radio signal in a first time-frequency resource set includes: the second node U2 receives the first radio signal in the first time-frequency resource set.

In one embodiment, the first information is transmitted via an air interface.

In one embodiment, the first information is transmitted via an interface between the UE 201 and the UE 241 in Embodiment 2.

Embodiment 6

Figure 6:
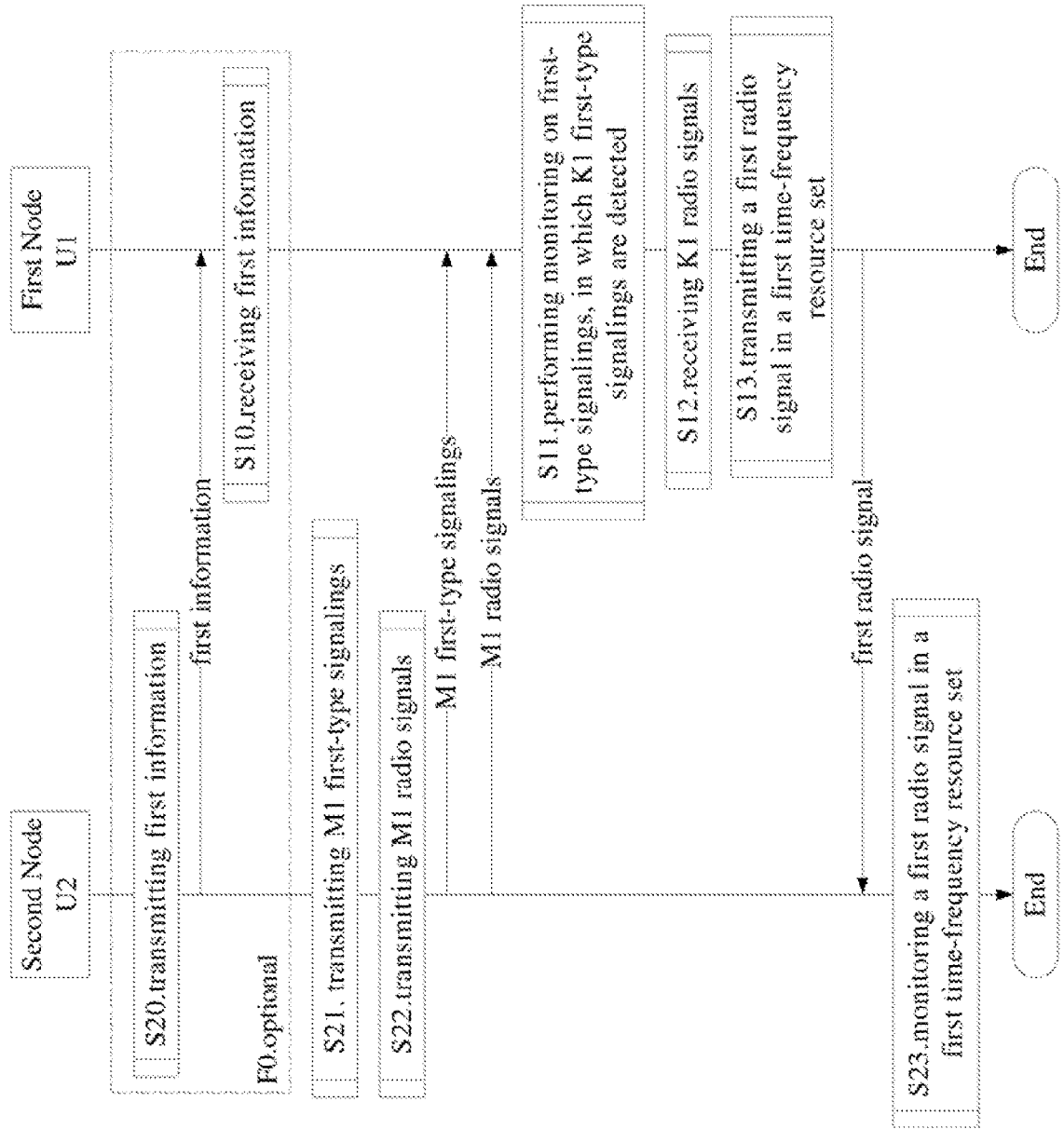
FIG. 6 illustrates a schematic diagram of a first time-frequency resource set according to one embodiment of the present disclosure.

Embodiment 6 illustrates a schematic diagram of a first time-frequency resource set, as shown in FIG. 6. In FIG. 6, the first time-frequency resource set and the second time domain resource set are associated; the second time domain resource set comprises M1 second time domain resource subsets, and the second node in the present disclosure transmits M1 first-type signalings respectively in the M1 second time domain resource subsets; the M1 first-type signalings are respectively used for scheduling M1 radio signals.

In one embodiment, any of the M1 second time domain resource subsets occupies a positive integer number of consecutive multicarrier symbols.

In one embodiment, the first time-frequency resource set and the second time domain resource set are configured by a higher layer signaling.

In one embodiment, the first time-frequency resource set occupies a positive integer number of multicarrier symbols in time domain, and a positive integer number of consecutive subcarriers in frequency domain.

Embodiment 7

Figure 7:
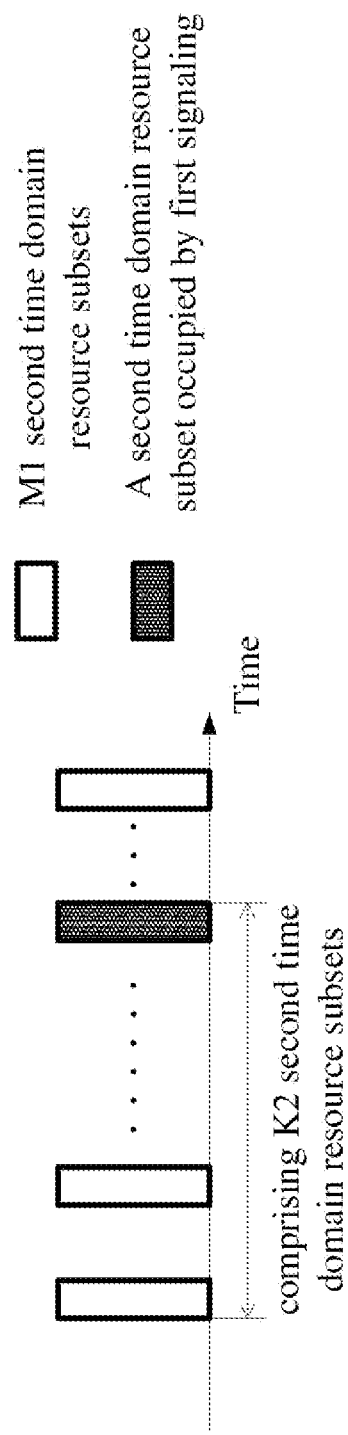
FIG. 7 illustrates a schematic diagram of a second time domain resource set according to one embodiment of the present disclosure.

Embodiment 7 illustrates a schematic diagram of a second time domain resource set, as shown in FIG. 7. In FIG. 7, the second time domain resource set comprises M1 second time domain resource subsets; among the M1 second time domain resource subsets the first K2 second time domain resource subsets in time domain are the K2 second time domain resource subsets in the present disclosure, and a second time domain resource subset occupied by the first signaling in the present disclosure is a last second time domain resource subset of the K2 second time domain resource subsets.

In one embodiment, the first node in the present disclosure does not detect first-type signalings in any of the M1 second time domain resource subsets located after the second time domain resource subset occupied by the first signaling.

In one embodiment, the M1 second time domain resource subsets are discrete in time domain.

In one embodiment, a number of bits comprised in the second bit sequence in the present disclosure is related to where the second time domain resource subset occupied by the first signaling ranks in the M1 second time domain resource subsets.

In one embodiment, a number of bits comprised in the second bit sequence in the present disclosure is related to a value indicated by the first field of the first signaling.

Embodiment 8

Figure 8:
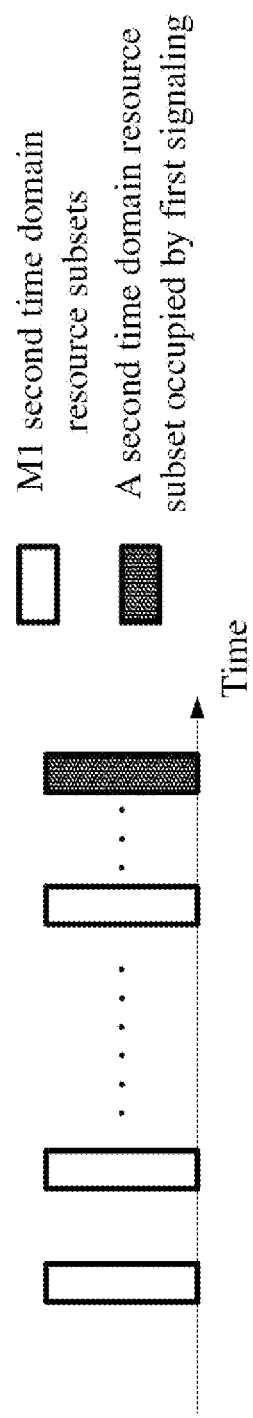
FIG. 8 illustrates a schematic diagram of a second time domain resource set according to another embodiment of the present disclosure.

Embodiment 8 illustrates a schematic diagram of a second time domain resource set, as shown in FIG. 8. In FIG. 8, the second time domain resource set comprises M1 second time domain resource subsets; the second node transmits the first signaling in a last second time domain resource subset of the M1 second time domain resource subsets, and the first node detects the first signaling.

In one embodiment, the M1 second time domain resource subsets are discrete in time domain.

In one embodiment, a number of bits comprised in the second bit sequence in the present disclosure is equal to M1.

Embodiment 9

Figure 9:
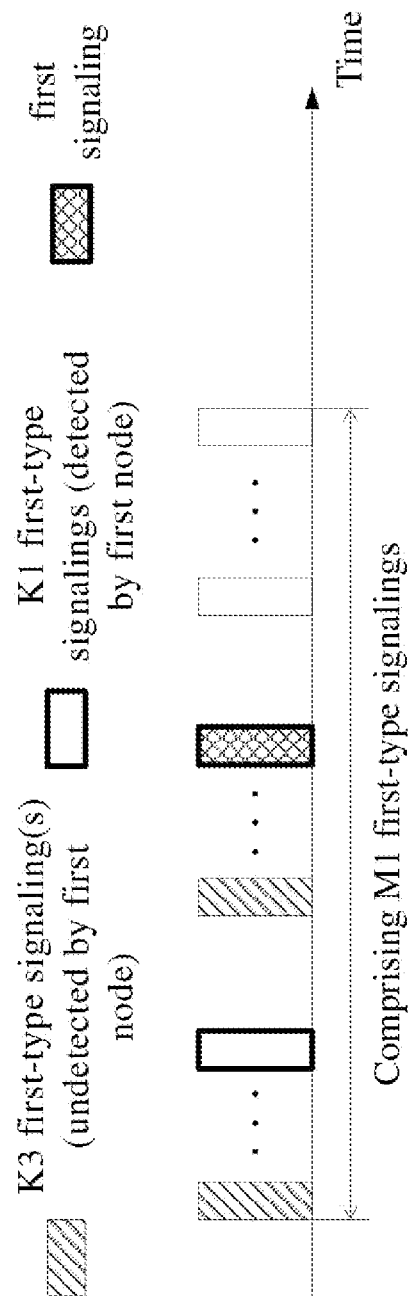
FIG. 9 illustrates a schematic diagram of M1 first-type signalings according to one embodiment of the present disclosure.

Embodiment 9 illustrates a schematic diagram of M1 first-type signaling, as shown in FIG. 9. In FIG. 9, K1 of the M1 first-type signalings are detected by the first node; a first signaling is a last first-type signaling of the K1 first-type signalings; before the first signaling, the second node has altogether transmitted K2 first-type signalings, and K3 of the K2 first-type signalings is(are) not detected by the first node; the K3 first-type signaling(s) is(are) K3 first-type signaling(s) out of the K2 first-type signalings other than the K1 first-type signalings; the K3 is a difference between the K2 and the K1.

Embodiment 10

Figure 10:
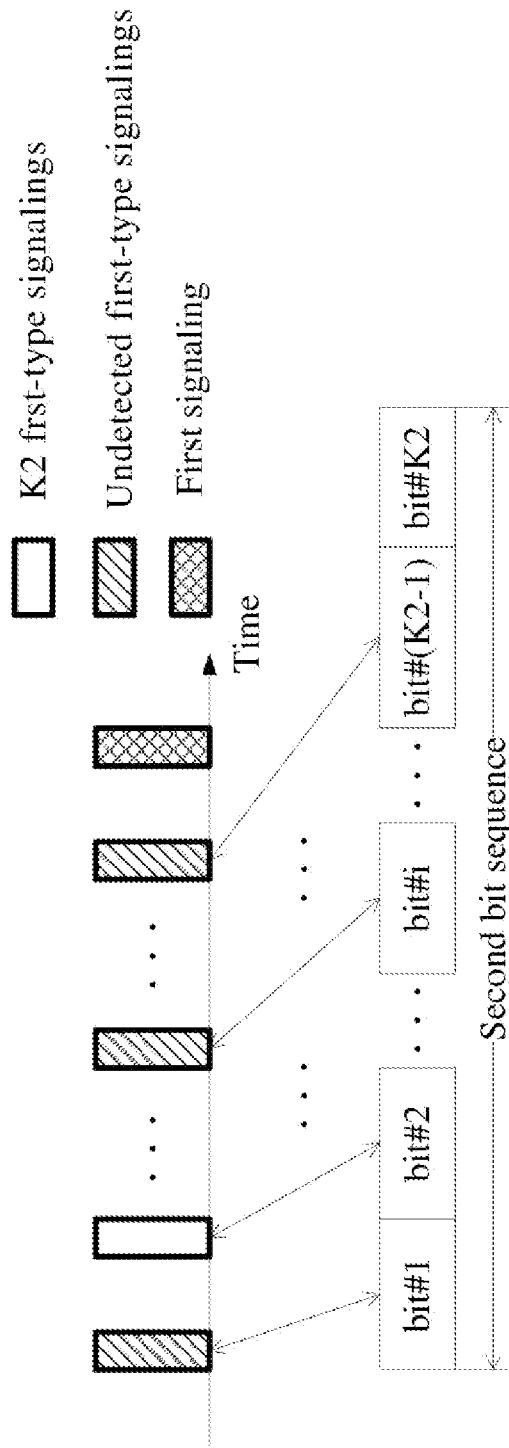
FIG. 10 illustrates a schematic diagram of a first radio signal according to one embodiment of the present disclosure.

Embodiment 10 illustrates a schematic diagram of a first radio signal, as shown in FIG. 1n FIG. 10, a second bit sequence is used for generating the first radio signal; the second bit sequence comprises K2 bits, the K2 bits are used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is the difference between the K2 and the K1; the K2 bits respectively correspond to bit #1 through bit #2 in FIG. 10.

In one embodiment, the first (K2-1) bit(s) respectively corresponds (correspond) to the first (K2-1) first-type signaling(s); a given bit is any of the first (K2-1) bit(s), the given bit being equal to 1 represents that a corresponding first-type signaling is not correctly detected, or the given bit being equal to 0 represents that a corresponding first-type signaling is correctly detected.

In one embodiment, the first (K2-1) bit(s) respectively corresponds (correspond) to the first (K2-1) first-type signaling(s); a given bit is any of the first (K2-1) bit(s), the given bit being equal to 0 represents that a corresponding first-type signaling is not correctly detected, or the given bit being equal to 1 represents that a corresponding first-type signaling is correctly detected.

In one embodiment, a last bit of the K2 bits being equal to 1 represents that there is(are) a bit(s) not having been correctly decoded in K1 bit blocks scheduled by the K1 first-type signalings, or the given bit being equal to 0 represents that there is not any bit block not having been correctly decoded in K1 bit blocks scheduled by the K1 first-type signalings.

In one embodiment, a last bit of the K2 bits being equal to 0 represents that there is(are) a bit(s) not having been correctly decoded in K1 bit blocks scheduled by the K1 first-type signalings, or the given bit being equal to 1 represents that there is not any bit block not having been correctly decoded in K1 bit blocks scheduled by the K1 first-type signalings.

In one embodiment, the second node determines according to the number of bits comprised in the second bit sequence whether the first node misses detection on any of the M1 first-type signalings located behind the first signaling after the K2 first-type signalings have been detected.

In one subembodiment, the number of bits comprised in the second bit sequence is equal to M1, the second node determines that the first node does not miss detection on any of the M1 first-type signalings located behind the first signaling after the K2 first-type signalings have been detected.

In one subembodiment, the number of bits comprised in the second bit sequence is unequal to M1, the second node determines that the first node misses detection on a first-type signaling(s) of the M1 first-type signalings located behind the first signaling after the K2 first-type signalings have been detected.

In one embodiment, the second bit sequence is scrambled through a first characteristic sequence.

In one embodiment, the first radio signal comprises a target field, the target field is used for indicating that K2 bits comprised in the second bit sequence are used for determining that the K3 first-type signaling(s) is(are) not correctly decoded.

Embodiment 11

Figure 11:
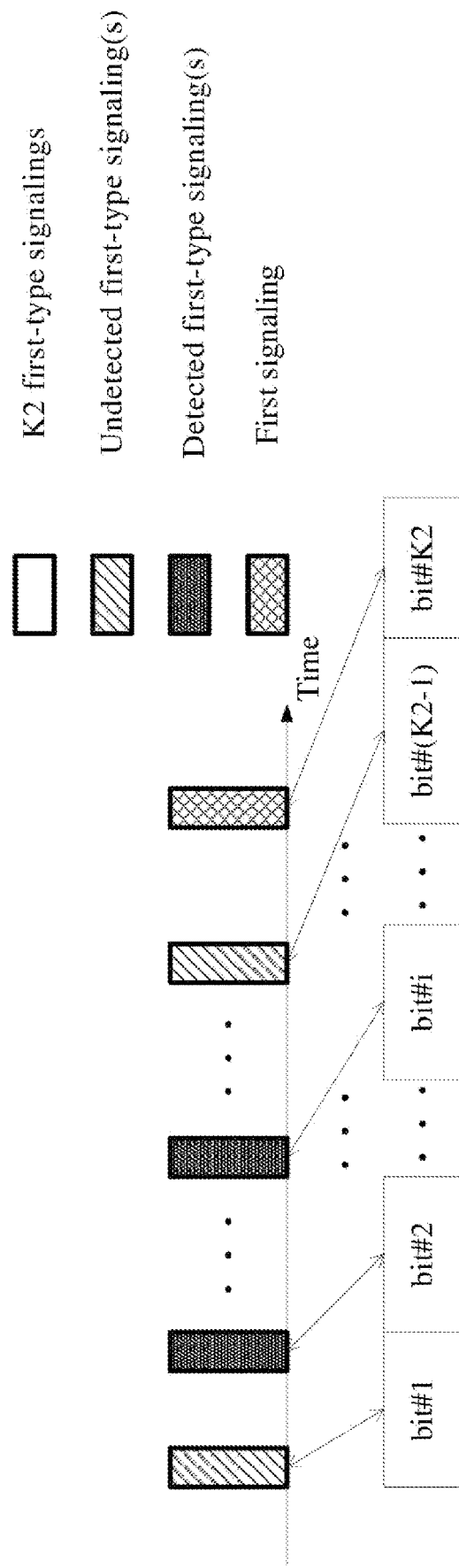
FIG. 11 illustrates a schematic diagram of a first radio signal according to another embodiment of the present disclosure.

Embodiment 11 illustrates another schematic diagram of a first radio signal, as shown in FIG. 11. In FIG. 11, the second bit sequence comprises K2 bits, the K2 bits are used for determining that K4 bit block(s) is(are) not correctly decoded, the K4 bit block(s) is(are) respectively used for generating K4 radio signal(s), the K4 radio signal(s) is(are) respectively scheduled by K4 of the K1 first-type signalings, the K4 is a positive integer no greater than the K1.

In one embodiment, the K2 bits respectively correspond to the K2 bit blocks respectively scheduled by the K2 first-type signalings; a given bit is any of the K2 bits, the given bit being equal to 1 represents that a corresponding first-type signaling is not correctly decoded, or the given bit being equal to 0 represents that a corresponding first-type signaling is correctly decoded.

In one embodiment, the K2 bits respectively correspond to the K2 bit blocks respectively scheduled by the K2 first-type signalings; a given bit is any of the K2 bits, the given bit being equal to 0 represents that a corresponding first-type signaling is not correctly decoded, or the given bit being equal to 1 represents that a corresponding first-type signaling is correctly decoded.

In one embodiment, the second bit sequence is scrambled through a second characteristic sequence.

In one embodiment, the first radio signal comprises a target field, the target field is used for indicating that K2 bits comprised in the second bit sequence are used for determining that the K4 bit block(s) is(are) not correctly decoded.

Embodiment 12

Figure 12:
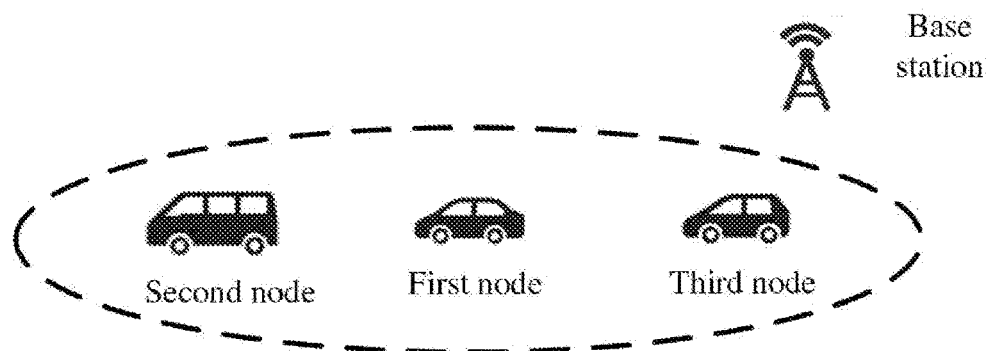
FIG. 12 illustrates a schematic diagram of a first node and a second node according to one embodiment of the present disclosure.

Embodiment 12 illustrates a schematic diagram of a first node and a second node, as shown in FIG. 12. In FIG. 12, the first node and the second node both belong to a given terminal group; the given terminal group comprises a positive integer number of terminals, and the second node is the group manager for the given terminal group; the area marked with dotted lines represents the coverage of the given terminal group; a third node in FIG. 12 is a node of the given terminal group other than the first node and the second node.

In one embodiment, the first node and the second node are in V2X communication with each other.

In one embodiment, a base station configures the K1 first-type time-frequency resource sets and then sends the configuration information to the second node.

In one embodiment, a base station configures the K1 second-type time-frequency resource sets and then sends the configuration information to the second node.

Embodiment 13

Figure 13:
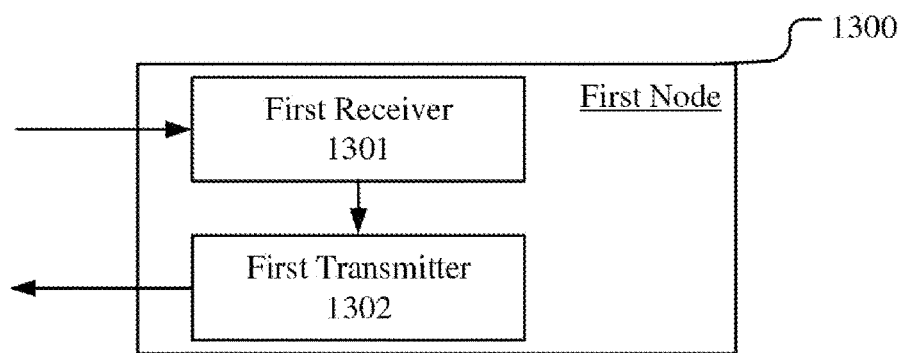
FIG. 13 illustrates a structure block diagram of a processing device in a first node according to one embodiment of the present disclosure.

Embodiment 13 illustrates a structure block diagram of a processing device in a first node, as shown in FIG. 13. In FIG. 13, the processing device in a first node 1300 comprises a first receiver 1301 and a first transmitter 1302:

The first receiver 1301, performing a monitoring on first-type signalings, in which K1 first-type signalings are detected; and the first transmitter 1302, transmitting a first radio signal in a first time-frequency resource set;

In Embodiment 13, each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; or, the first radio signal is used for determining that there is not any first-type signaling associated to the first time-frequency resource set not having been correctly decoded in a time domain position before the first signaling, and at least one of the K1 first-type signalings schedules a bit block that is not decoded correctly; the K1 is a positive integer.

In one embodiment, the above phrase that each of the K1 first-type signalings is associated to the first time-frequency resource set means that the K1 is greater than 1, each of the K1 first-type signalings indicates the first time-frequency resource set.

In one embodiment, the above phrase that each of the K1 first-type signalings is associated to the first time-frequency resource set means that time domain resources occupied by each of the K1 first-type signalings belong to a second time domain resource set, the second time domain resource set is associated to the first time-frequency resource set.

In one embodiment, a first bit is used for generating the first radio signal; the first bit is used for determining that there is(are) first-type signaling(s) associated to the first time-frequency resource set not having been correctly decoded in a time domain position before the first signaling; or, the first bit is used for determining that there is not any first-type signaling associated to the first time-frequency resource set not having been correctly decoded in a time domain position before the first signaling, and at least one of the K1 first-type signalings schedules a bit block that is not decoded correctly.

In one embodiment, a second bit sequence is used for generating the first radio signal; the second bit sequence comprises K2 bits, the K2 is a positive integer not less than the K1; K2 second time domain resource subsets are associated to the first time-frequency resource sets, the K1 first-type signalings are transmitted by the transmitter of the K1 first-type signalings respectively in K1 of the K2 second time domain resource subsets; the K2 bits are used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1.

In one embodiment, a second bit sequence is used for generating the first radio signal; the second bit sequence comprises K2 bits, the K2 is a positive integer not less than the K1; K2 second time domain resource subsets are associated to the first time-frequency resource sets, the K1 first-type signalings are transmitted by the second node U2 respectively in K1 of the K2 second time domain resource subsets; the K2 bits are used for determining that K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

In one embodiment, the first receiver 1301 receives K1 radio signals; the K1 first-type signalings are respectively used for scheduling the K1 radio signals, K1 bit blocks are used for generating the K1 radio signals.

In one embodiment, each of the M1 first-type signalings is associated to the first time-frequency resource set, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signalings; the M1 is a positive integer not less than the K1.

In one embodiment, the first receiver 1301 comprises at least the first 4 of the antenna 452, the receiver 454, the multi-antenna receiving processor 458, the receiving processor 456 and the controller/processor 459 in Embodiment 4.

In one embodiment, the first transmitter 1302 comprises at least the first 4 of the antenna 452, the transmitter 454, the multi-antenna transmitting processor 457, the transmitting processor 468 and the controller/processor 459 in Embodiment 4.

Embodiment 14

Figure 14:
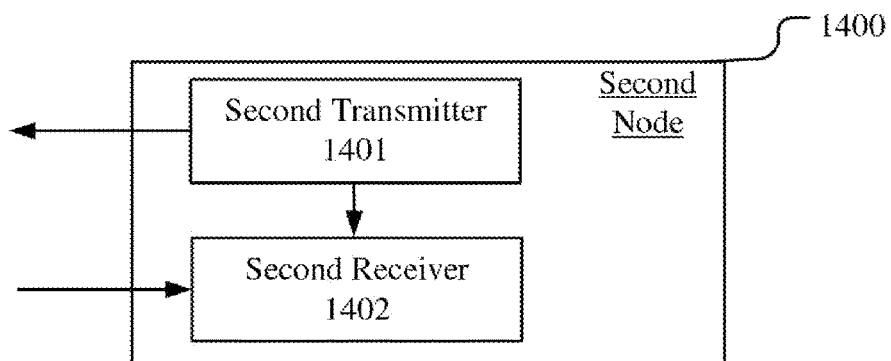
FIG. 14 illustrates a structure block diagram of a processing device in a second node according to one embodiment of the present disclosure.

Embodiment 14 illustrates a structure block diagram of a processing device in a second node, as shown in FIG. 14. In FIG. 14, the processing device in a second node 1400 comprises a second transmitter 1401 and a second receiver 1402:

The second transmitter 1401, transmitting M1 first-type signalings; and the second receiver 1402, monitoring a first radio signal in a first time-frequency resource set.

In Embodiment 14, each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; or, the first radio signal is used for determining that there is not any first-type signaling associated to the first time-frequency resource set not having been correctly decoded by the first node in a time domain position before the first signaling, and at least one of the K1 first-type signalings schedules a bit block that is not decoded correctly; the K1 is a positive integer; the M1 is a positive integer not less than the K1.

In one embodiment, the meaning of the above phrase that each of the M1 first-type signalings is associated to the first time-frequency resource set includes: the M1 is greater than 1, each of the M1 first-type signalings indicates the first time-frequency resource set.

In one embodiment, the meaning of the above phrase that each of the M1 first-type signalings is associated to the first time-frequency resource set includes: time domain resources occupied by each of the M1 first-type signalings belong to a second time domain resource set, the second time domain resource set is associated to the first time-frequency resource set.

In one embodiment, a first bit is used for generating the first radio signal; the first bit is used for determining that there is(are) first-type signaling(s) associated to the first time-frequency resource set not having been correctly decoded in a time domain position before the first signaling; or, the first bit is used for determining that there is not any first-type signaling associated to the first time-frequency resource set not having been correctly decoded in a time domain position before the first signaling, and at least one of the K1 first-type signalings schedules a bit block that is not decoded correctly by the first node.

In one embodiment, a second bit sequence is used for generating the first radio signal; the second bit sequence comprises K2 bits, the K2 is a positive integer not less than the K1; K2 second time domain resource subsets are associated to the first time-frequency resource sets, the K1 first-type signalings are transmitted by the transmitter of the K1 first-type signalings respectively in K1 of the K2 second time domain resource subsets; the K2 bits are used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1.

In one embodiment, a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining that K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

In one embodiment, a second bit sequence is used for generating the first radio signal; the second bit sequence comprises a first bitmap, the first bitmap comprises K2 bits; the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the first bitmap is used for determining that K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1.

In one embodiment, the second transmitter 1401 transmits M1 radio signals; the M1 first-type signalings are respectively used for scheduling the M1 radio signals, M1 bit blocks are used for generating the M1 radio signals.

In one embodiment, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signaling.

In one embodiment, the second transmitter 1401 comprises at least the first 4 of the antenna 420, the transmitter 418, the multi-antenna transmitting processor 471, the transmitting processor 416 and the controller/processor 475 in Embodiment 4.

In one embodiment, the second receiver 1402 comprises at least the first 4 of the antenna 420, the receiver 418, the multi-antenna receiving processor 472, the receiving processor 470 and the controller/processor 475 in Embodiment 4.

The ordinary skill in the art may understand that all or part of steps in the above method may be implemented by instructing related hardware through a program. The program may be stored in a computer readable storage medium, for example Read-Only-Memory (ROM), hard disk or compact disc, etc. Optionally, all or part of steps in the above embodiments also may be implemented by one or more integrated circuits. Correspondingly, each module unit in the above embodiment may be implemented in the form of hardware, or in the form of software function modules. The present disclosure is not limited to any combination of hardware and software in specific forms. The first node and the second node in the present disclosure include but are not limited to mobile phones, tablet computers, notebooks, network cards, low-consumption equipment, enhanced MTC (eMTC) terminals, NB-IOT terminals, vehicle-mounted communication equipment, vehicles, automobiles, RSU, aircrafts, diminutive airplanes, unmanned aerial vehicles, telecontrolled aircrafts, etc. The base station in the present disclosure includes but is not limited to macro-cellular base stations, micro-cellular base stations, home base stations, relay base station, eNB, gNB, Transmitter Receiver Point (TRP), GNSS, relay satellites, satellite base stations, space base stations, RSU and other radio communication equipment.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A method in a first node for wireless communication, comprising:
    performing a monitoring on first-type signalings, in which K1 first-type signalings are detected; and
    transmitting a first radio signal in a first time-frequency resource set;
    wherein each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; or, the first radio signal is used for determining that there is not any first-type signaling associated to the first time-frequency resource set not having been correctly decoded in a time domain position before the first signaling, and at least a bit block scheduled by one of the K1 first-type signaling is not decoded correctly; the K1 is a positive integer; a physical layer channel occupied by any of the K1 first-type signalings includes a Physical Sidelink Control Channel; a physical layer channel occupied by the first radio signal includes a Physical Sidelink Feedback Channel; the K1 first-type signalings are detected means that the K1 first-type signalings respectively comprise K1 Cyclic Redundancy Check (CRC) sequences, the first node determines that the K1 first-type signalings are correctly decoded respectively based on detections on the K1 CRC sequences.

2. The method in the first node according to claim 1, wherein the phrase that each of the K1 first-type signalings is associated to the first time-frequency resource set means that the K1 is greater than 1, each of the K1 first-type signalings indicates the first time-frequency resource set;
    or, the phrase that each of the K1 first-type signalings is associated to the first time-frequency resource set means that time domain resources occupied by each of the K1 first-type signalings belong to a second time domain resource set, the second time domain resource set is associated to the first time-frequency resource set.

3. The method in the first node according to claim 1, wherein a first bit is used for generating the first radio signal; the first bit is used for determining that there is(are) first-type signaling(s) associated to the first time-frequency resource set not having been correctly decoded in a time domain position before the first signaling; or, the first bit is used for determining that there is not any first-type signaling associated to the first time-frequency resource set not having been correctly decoded in a time domain position before the first signaling, and at least one of the K1 first-type signalings schedules a bit block that is not decoded correctly.

4. The method according to claim 1, wherein a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining one of the following cases:

K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1;

K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

5. The method according to claim 1, comprising:
receiving K1 radio signals;
wherein the K1 first-type signalings are respectively used for scheduling the K1 radio signals, K1 bit blocks are used for generating the K1 radio signals;
or, each of the M1 first-type signalings is associated to the first time-frequency resource set, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signalings; the M1 is a positive integer not less than the K1.

6. A method in a second node for wireless communication, comprising:
transmitting M1 first-type signalings; and
monitoring a first radio signal in a first time-frequency resource set;
wherein each of the M1 first-type signalings is associated to the first time-frequency resource set; a transmitter of the first radio signal is a first node; the first node performs a monitoring on first-type signalings, in which K1 of the M1 first-type signalings are detected, a first signaling is a last first-type signaling of the K1 first-type signalings in time domain; the first radio signal is used for determining that there is(are) first-type signaling(s) associated to the first time-frequency resource set not having been correctly decoded by the first node in a time domain position before the first signaling; or, the first radio signal is used for determining that there is not any first-type signaling associated to the first time-frequency resource set not having been correctly decoded by the first node in a time domain position before the first signaling, and at least a bit block scheduled by one of the K1 first-type signaling is not decoded correctly; the K1 is a positive integer, and the M1 is a positive integer not less than the K1; a physical layer channel occupied by any of the K1 first-type signalings includes a Physical Sidelink Control Channel; a physical layer channel occupied by the first radio signal includes a Physical Sidelink Feedback Channel; the K1 first-type signalings are detected means that the K1 first-type signalings respectively comprise K1 Cyclic Redundancy Check (CRC) sequences, the first node determines that the K1 first-type signalings are correctly decoded respectively based on detections on the K1 CRC sequences.

7. The method in the second node according to claim 6, wherein the phrase that each of the K1 first-type signalings is associated to the first time-frequency resource set means that the K1 is greater than 1, each of the K1 first-type signalings indicates the first time-frequency resource set;
or, the phrase that each of the K1 first-type signalings is associated to the first time-frequency resource set means that time domain resources occupied by each of the K1 first-type signalings belong to a second time domain resource set, the second time domain resource set is associated to the first time-frequency resource set.

8. The method in the second node according to claim 6, wherein a first bit is used for generating the first radio signal; the first bit is used for determining that there is(are) first-type signaling(s) associated to the first time-frequency resource set not having been correctly decoded in a time domain position before the first signaling; or, the first bit is used for determining that there is not any first-type signaling associated to the first time-frequency resource set not having been correctly decoded in a time domain position before the first signaling, and at least one of the K1 first-type signalings schedules a bit block that is not decoded correctly.

9. The method in the second node according to claim 6, wherein a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining one of the following cases:

K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1;

K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

10. The method in the second node according to claim 6, comprising:
transmitting M1 radio signals;
wherein the M1 first-type signalings are respectively used for scheduling the M1 radio signals, M1 bit blocks are used for generating the M1 radio signals;
or, each of the M1 first-type signalings is associated to the first time-frequency resource set, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signaling.

11. A first node for wireless communication, comprising:
a first receiver, performing a monitoring on first-type signalings, in which K1 first-type signalings are detected; and
a first transmitter, transmitting a first radio signal in a first time-frequency resource set;
wherein each of the K1 first-type signalings is associated to the first time-frequency resource set; a first signaling is a last first-type signaling of the K1 first-type signalings in time domain; the first radio signal is used for determining that there is(are) first-type signaling(s) associated to the first time-frequency resource set not having been correctly decoded in a time domain position before the first signaling; or, the first radio signal is used for determining that there is not any first-type signaling associated to the first time-frequency resource set not having been correctly decoded in a time domain position before the first signaling, and at least a bit block scheduled by one of the K1 first-type signaling is not decoded correctly; the K1 is a positive integer; a physical layer channel occupied by any of the K1 first-type signalings includes a Physical Sidelink Control Channel; a physical layer channel occupied by the first radio signal includes a Physical Sidelink Feedback Channel; the K1 first-type signalings are detected means that the K1 first-type signalings respectively comprise K1 Cyclic Redundancy Check (CRC) sequences, the first node determines that the K1 first-type signalings are correctly decoded respectively based on detections on the K1 CRC sequences.

12. The first node according to claim 11, wherein the phrase that each of the K1 first-type signalings is associated to the first time-frequency resource set means that the K1 is greater than 1, each of the K1 first-type signalings indicates the first time-frequency resource set;
or the phrase that each of the K1 first-type signalings is associated to the first time-frequency resource set means that time domain resources occupied by each of the K1 first-type signalings belong to a second time domain resource set, the second time domain resource set is associated to the first time-frequency resource set.

13. The first node according to claim 11, wherein a first bit is used for generating the first radio signal; the first bit is used for determining that there is(are) first-type signaling(s) associated to the first time-frequency resource set not having been correctly decoded in a time domain position before the first signaling; or, the first bit is used for determining that there is not any first-type signaling associated to the first time-frequency resource set not having been correctly decoded in a time domain position before the first signaling, and at least one of the K1 first-type signalings schedules a bit block that is not decoded correctly.

14. The first node according to claim 11, wherein a second bit sequence is used for generating the first radio signal; the second bit sequence comprises K2 bits, the K2 is a positive integer not less than the K1; K2 second time domain resource subsets are associated to the first time-frequency resource set, the K1 first-type signalings are transmitted by a transmitter of the K1 first-type signalings respectively in K1 out of K2 second time domain resource subsets; the K2 bits are used for determining one of the following cases:
K3 first-type signaling(s) is(are) not correctly decoded, the K3 first-type signaling(s) is(are) transmitted by the transmitter of the K1 first-type signalings respectively in K3 second time domain resource subset(s) out of the K2 second time domain resource subsets other than the K1 second time domain resource subsets, the K3 is a difference between the K2 and the K1;
K4 bit block(s) is(are) not correctly decoded, the K4 bit blocks is(are) respectively used for generating K4 radio signal(s), the K4 radio signal(s) is(are) respectively scheduled by K4 first-type signaling(s) of the K1 first-type signalings, the K4 is a positive integer not greater than the K1.

15. The first node according to claim 11, wherein the first receiver receives K1 radio signals; the K1 first-type signalings are respectively used for scheduling the K1 radio signals, K1 bit blocks are used for generating the K1 radio signals; a physical layer channel occupied by any of the K1 radio signals is a Physical Sidelink Shared Channel.

16. The first node according to claim 11, wherein each of the M1 first-type signalings is associated to the first time-frequency resource set, any of the K1 first-type signalings is one of the M1 first-type signalings; a given first-type signaling is any of the M1 first-type signalings, the given first-type signaling comprises a first field, the first field is used for determining a sequence number of the given first-type signaling in the M1 first-type signalings; the M1 is a positive integer not less than the K1.

17. The first node according to claim 11, wherein the K1 is equal to 1.

18. The first node according to claim 15, wherein a transport channel occupied by any of the K1 radio signals is a Sidelink Shared Channel.

19. The first node according to claim 12, wherein the first time-frequency resource set and the second time domain resource set are configured by a higher layer signaling.

20. The first node according to claim 15, wherein the first time-frequency resource set comprises a positive integer number of resource elements.

\* \* \* \* \*